US006829369B2

(12) United States Patent
Poulin et al.

(10) Patent No.: US 6,829,369 B2
(45) Date of Patent: Dec. 7, 2004

(54) CODING DEPTH FILE AND METHOD OF POSTAL ADDRESS PROCESSING USING A CODING DEPTH FILE

(75) Inventors: Jeffrey Scott Poulin, Endicott, NY (US); Robert Strebel, Endwell, NY (US); Joseph P. Zanovitch, Barton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 668 days.

(21) Appl. No.: 09/860,307

(22) Filed: May 18, 2001

(65) Prior Publication Data

US 2002/0172399 A1 Nov. 21, 2002

(51) Int. Cl.[7] .................................................. G06K 9/00
(52) U.S. Cl. .................................................. 382/101
(58) Field of Search ................................ 382/101, 148; 209/509, 584, 606; 348/91; 707/7; 705/62, 406

(56) References Cited

U.S. PATENT DOCUMENTS

| | | | | |
|---|---|---|---|---|
| 5,031,223 A | | 7/1991 | Rosenbaum et al. | 382/101 |
| 5,103,489 A | * | 4/1992 | Miette | 382/101 |
| 5,301,320 A | | 4/1994 | McAtee et al. | 705/9 |
| 5,535,322 A | | 7/1996 | Hecht | 705/1 |
| 5,596,750 A | | 1/1997 | Li et al. | 718/101 |
| 5,667,078 A | | 9/1997 | Walach | 209/584 |
| 5,721,913 A | | 2/1998 | Ackroff et al. | 707/103 R |
| 5,805,710 A | * | 9/1998 | Higgins et al. | 382/101 |
| 5,893,128 A | | 4/1999 | Nauckhoff | 715/511 |
| 6,014,450 A | * | 1/2000 | Heilper et al. | 382/101 |
| 6,728,391 B1 | * | 4/2004 | Wu et al. | 382/101 |
| 2001/0021945 A1 | * | 9/2001 | Matsuura | 709/217 |

* cited by examiner

*Primary Examiner*—Andrew W. Johns
*Assistant Examiner*—Shervin Nakhjavan
(74) *Attorney, Agent, or Firm*—Louis J. Franco; Leland D. Schultz; Patrick M. Hogan

(57) ABSTRACT

The processing of mail pieces relies in part on automated address interpretation of captured address field images to generate sortation signals that control automated mail sorting machinery at outgoing and incoming mail centers. In alternative implementations, a coding depth file ("CDF") controls (i) the depth to which a captured address field image is resolved and (ii) a time delay in performing address interpretation. In one aspect, a CDF includes a first set of data associating a depth value with each of a selected plurality of incoming mail centers to which an outgoing mail center sends mail pieces. The depth value controls the depth to which a stored address field image is resolved and corresponds to a level of refinement to which automated sorting machinery at the associated incoming mail center sorts mail pieces. In another aspect, a CDF includes a second set of data associating a deferral time with stored address data, the deferral time representing at least an acceptable maximum length of time before sortation signals are rendered accessible to the automated sorting machinery at the incoming mail center.

20 Claims, 16 Drawing Sheets

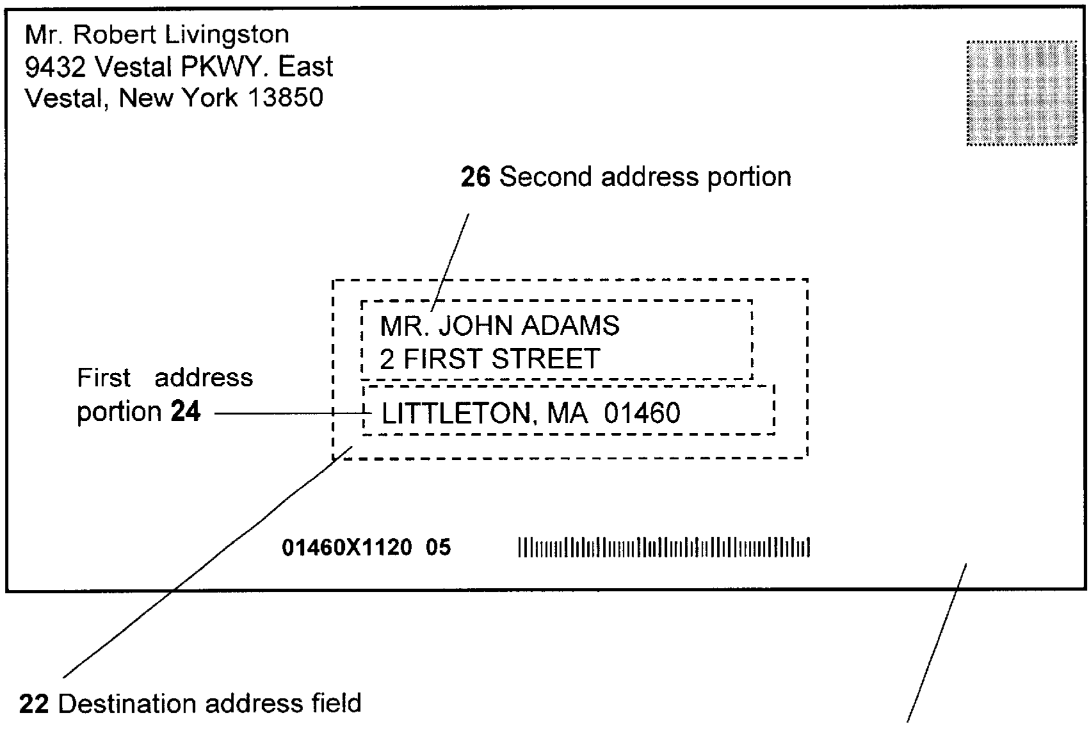
FIG. 1
Mail Piece *(front side)*
FIG. 1A
Mail Piece *(rear side)*
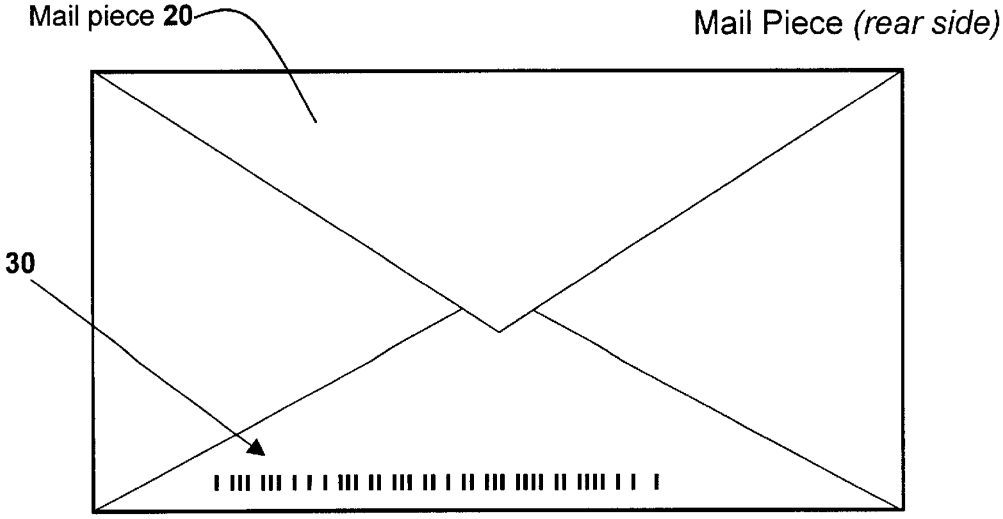

600

| Incoming Mail Center – 3 Digit ZIP Range | Incoming Mail Center - Facility Name | Depth Value |
|---|---|---|
| 010 - 013 | Springfield, MA | 3 |
| 014 – 017 | Worcester, MA | 4 |
| . . . . . | | |
| 021 | Boston, MA (1) | 4 |
| 022 | Boston, MA (2) | 4 |
| . . . . . . | | |
| 050 – 053 | White River Junction, VT | 2 |
| . . . . | | |
| 070 - 071 | Newark, NJ | 4 |
| . . . . . . | | |
| 104 | Bronx, NY | 4 |
| 105 | Weschester, NY | 3 |
| . . . . | | |
| 120 -122 | Albany, NY | 4 |
| . . . . . . | | |
| 137-139 | Binghamton, NY | 4 |
| . . . . . | | |
| 150 - 154 | Pittsburgh, PA | 4 |
| . . . . . . . | | |
| 190 - 192 | Philadelphia, PA | 4 |
| . . . . . . . | | |
| 228 – 229 | Charlottesville, VA | 2 |
| . . . . . . . | | |
| 250 - 253 | Charleston, WV | 3 |
| . . . . . . . . | | |
| 302 – 303, 311 | Atlanta, GA | 4 |
| . . . . . . . . | | |
| 403 - 405 | Lexington, KY | 3 |
| . . . . . . | | |
| 460 – 462 | Indianapolis, IN | 4 |
| . . . . . . | | |
| 500 – 503 | Des Moines, IA | 3 |
| . . . . . . | | |
| 606 – 608 | Chicago, IL | 4 |
| . . . . . . | | |
| 720 – 722 | Little Rock, AK | 3 |
| . . . . . . . . | | |
| 800 – 802 | Denver, CO | 4 |
| . . . . . . . | | |
| 919 – 921 | San Diego, CA | 4 |
| . . . . . . . | | |

602

FIG. 5B

| LEGEND | |
|---|---|
| DEPTH VALUE | |
| 1 | Outward |
| 2 | Partial Inward |
| 3 | Full Inward |
| 4 | Delivery Sequence |

620

| Incoming Mail Center – 3 Digit ZIP Range | Incoming Mail Center - Facility Name | Depth Value (default) | Disparity Code | Five-Digit Area | Secondary Depth Value |
|---|---|---|---|---|---|
| 010 - 013 | Springfield, MA | 3 | N | | |
| 014 – 017 | Worcester, MA | 4 | Y | 01430 Ashburn | 2 |
| | | | | 01436 Baldwin | 2 |
| | | | | 01450 Groton | 3 |
| | | | | 01451 Harvard | 3 |
| | | | | 01464 Shirley | 3 |
| . . . . . | | | | | |
| 021 | Boston, MA (1) | 4 | N | | |
| 022 | Boston, MA (2) | 4 | N | | |
| . . . . . . | | | | | |
| 050 – 053 | White River Junction, VT | 2 | N | | |
| . . . . | | | | | |
| 070 - 071 | Newark, NJ | 4 | N | | |
| . . . . . . | | | | | |
| 104 | Bronx, NY | 4 | N | | |

624

Disparity Codes Y/N

622

FIG. 5C

| Outgoing Mail Center | Incoming Mail Center | Departure Time | Deferral Time (in hrs) (Min. to Max. Time Window) |
|---|---|---|---|
| Binghamton, NY | 014xx-017xx Worcester, MA | 10:00am | 7.00 < $T_D$ < 9.00 |
| Binghamton, NY | " | 7:00pm | 5.00 < $T_D$ < 7.00 |
| Binghamton, NY | 140xx-143 Buffalo, NY | 10:10am | 18.25 < $T_D$ < 19.25 |
| Binghamton, NY | " | 4:30pm | 16.50 < $T_D$ < 17.50 |
| Binghamton, NY | " | 7:25pm | 15.75 < $T_D$ < 17.00 |
| Binghamton, NY | 144-146 Rochester, NY | 10:10am | 16.25 < $T_D$ < 17.50 |
| Binghamton, NY | " | 4:30pm | 14.50 < $T_D$ < 16.25 |
| Binghamton, NY | " | 7:25pm | 13.75 < $T_D$ < 15.50 |
| .......... | ........ | ..... | .... |
| Binghamton, NY | ........ | ..... | .... |
| Binghamton, NY | ........ | ..... | .... |
| Binghamton, NY | ........ | ..... | .... |
| Binghamton, NY | 786-787,789 Austin,TX | 8:30pm | 43.00 < $T_D$ < 46.25 |
| Binghamton, NY | ........ | ..... | .... |
| Binghamton, NY | 797 Midland, TX | 8:30pm | 47.75 < $T_D$ < 49.50 |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| Binghamton, NY | | | |
| | | | |
| | | | |
| | | | |

Scheduler 180 including Look-up Table

FIG. 7

CODING DEPTH FILE AND METHOD OF POSTAL ADDRESS PROCESSING USING A CODING DEPTH FILE

BACKGROUND

Individuals, institutions, and post office employees introduce items of mail into the postal system at local post office branches. Once the receiving post office branch is in possession of a mail piece, the mail piece begins a journey through a highly organized system. Mail received into the postal system at a local branch office is eventually transported to a centralized postal hub. There are in excess of 250 postal hubs in the United States. These "hubs" are known by alternative names including (i) processing and distribution centers, (ii) general mail facilities and (iii) mail distribution centers. Postal hubs are regional mail centers that service individual post office branches within a particular range of ZIP Codes. Typically, a postal hub services one or more "three-digit ZIP Code areas." For example, the Central Massachusetts Processing and Distribution Center (also known as the "Worcester Facility") services the local post office branches situated in all the ZIP Codes beginning with "014", "015," "016," and "017." That is, mail destined for or departing from a local branch office within a ZIP Code beginning with any one of the four sets of three digits in the previous sentence will, under normal circumstances, pass through the Worcester facility. The Worcester facility services more than two dozen towns, each with its own local branch office. Nationally, the 250 plus hubs collectively service approximately five thousand individual postal branch offices.

Mail coming into and going out of the various local branch offices in a particular geographic region is processed through one or more hubs before delivery to its final destination. For instance, a mail piece originating in Southbridge, Mass. (01550) and destined for Littleton, Mass. (01460) is processed through the Worcester facility only (i.e., a single hub), because the ZIP Code of origin and the destination ZIP Code are both serviced by the Worcester hub. However, in many instances, a mail piece is processed through two hubs between the time of its introduction into the system and its ultimate delivery to an addressee.

This is the case, for instance, when a mail piece is received at a branch office that is not serviced by the same hub that services the branch office responsible for delivery of the mail piece to the intended recipient. In such a case, a mail piece received at a branch office is transported to an "outgoing hub" where the mail piece is sorted and routed for transportation to an "incoming hub." The incoming hub is the hub that services the local branch office responsible for delivery of the mail piece to the intended recipient. For example, a mail piece originating at Littleton, Mass. (01460) and destined for Owego, N.Y. (13827) is transported from Littleton, Mass. to the Worcester, Mass. facility (i.e, the outgoing hub). At the Worcester facility, the mail piece is sorted and deposited on an appropriate vehicle for transport to the postal hub at Binghamton, N.Y. (i.e., the incoming hub) because the Binghamton hub services the local post office branches beginning with "137," "138," and "139." Once delivered to the Binghamton hub, the mail piece is sorted and delivered to the local, Owego, N.Y. branch office (13827) from which it is transported to the mailbox of the addressee, for example.

Mechanical, electronic and computer apparatus enable postal clerks to process large volumes of mail each day.

Larger postal facilities (e.g., hubs) are equipped with rigid containers, bins on wheels, conveyor belts, forklifts, cranes, and other machinery to facilitate the handling of large quantities of mail. There are also segregating machines to separate a mixture of mail into different types.

Some first-class mail is precancelled. If not precancelled, mail pieces must go through a facer-canceler machine. Such a machine can process tens of thousands of letters an hour. Facing is the process of aligning letters so that the address side is facing the canceler, with the stamps in the same corner. The machine prints wavy black lines over the stamp, for example, canceling it so that it cannot be used again. Alongside the stamp is printed a circle containing the date, place, and time of stamping. The circle and wavy lines constitute the letter's postmark. Typically, mail pieces are canceled at a hub.

After postmarking is completed, mail pieces are ready to be sorted according to destination. Traditionally, clerks sorted mail pieces by hand according to destination, using racks of pigeonholes, called distribution cases. Increasingly, however, the sorting process has been automated.

The United States introduced ZIP (Zone Improvement Plan) Codes in 1963. Users of the mail service place a five-digit number (ZIP Code) at the end of the address. The first three digits identify the section of the country to which the mail piece is being sent, while the last two identify the specific post office or zone at the destination. ZIP Codes enable the use of optical and electronic reading and sorting equipment.

In the 1980's the United States Postal Service introduced a voluntary nine-digit ZIP Code system (i.e., ZIP+4). Four additional digits were added to the original ZIP Code after a hyphen to speed automated sorting operations. Of the four additional numbers, the first two indicate a specific sector of a city or town such as a cluster of streets or large buildings. The second two numbers represent an even smaller segment such as one side of a city block, a series of houses along a street, one floor of a large building, or a group of post office boxes. A still further refinement of this system was subsequently made with the introduction of eleven-digit codes (i.e., ZIP+4+2). The last two digits an eleven-digit code enable the pre-arrangement of mail pieces in accordance with a postal delivery person's "delivery sequence," for example. That is, the tenth and eleventh digits of an eleven digit code enable the pre-arrangement of a plurality of mail pieces destined for a particular sector/segment of a city or town in accordance with the order in which they are to be delivered by the postal employee, for example. In a rural or suburban town, for instance, the last two digits of the eleven digit ZIP Code could correspond to a specific single family house or an individual unit of an apartment complex or other multifamily dwelling. In a city, a large office building might be designated as a sector, one or more floors of the building as a sub-sector and the tenth and eleventh digits used to designate individual suites or apartments within each sub-sector.

Increasingly, tasks once performed manually are now performed mechanically, electronically and by computers. For instance, destination addresses once read by human beings who sorted mail pieces into compartments based on destination city, for example, are now read by machine (e.g., scanned by optical character recognition apparatus). An image of a destination address is captured and stored in computer memory. Character recognition algorithms analyze the captured image and resolve it into a string of alphanumeric data to generate signals that instruct sorting machines where to route individual mail pieces. Such systems have dramatically increased the efficiency of the postal system and the overall volume of mail that the system can handle.

Despite the technological advances of recent decades, postal management is still largely concerned with the efficient administration and deployment of large bodies of manpower, the organization of large transport fleets, many aspects of property management, and financial and economic problems. Automation and computer technology have increasingly been exploited as a management aid with the realization that the postal service operates within a commercial market where competition from private companies can be fierce and efficiency is the watchword.

With a steady emphasis on efficiency, processes have been devised to allocate resources in order to facilitate the processing of as many mail pieces as possible during any particular window of time. Generally, the more automation that is implemented into the processing of mail, the less expensive mail processing becomes. It is frequently not enough, however, to automate, the automation must also be optimized. In some aspects of mail processing, human resources will remain indispensable. However, avoiding the needless use of human resources contributes significantly to cost savings.

Currently full resolution of address information down to delivery sequence is performed regardless of whether the full range of resolved information can be utilized by the facilities and mail sorting equipment through which a particular mail piece will pass. For instance, the 250 plus processing hubs within the U.S. Postal system are disparately equipped. Some incoming hubs enjoy a full array of postal processing machinery and computer equipment that can make use of the sorting signals resulting from full resolution of an eleven-digit code or of an address down to house number, for instance, and, thereby, sort mail pieces down to delivery sequence. A less equipped incoming hub may only be able to refine mail sortation down to subsector. Still less refined systems may only be able to sort down to sector or even town (e.g., the 5-digit ZIP Code level) only. The greater the depth to which mail-processing architecture can resolve delivery address information, the less human intervention is required. Human intervention and interpretation requires employee time, which directly translates to payroll expense for the employer.

For example, consider an incoming postal hub that can perform automated sortation on the basis of signals resulting from automated address interpretation only to a depth of the five-digit ZIP Code or town name, for instance. In such a case, mail pieces passing through the incoming mail center will be automatically sorted to a level that will get them on an appropriate transport vehicle destined for the local postal branch office responsible for delivery to the ultimate addressee. Further sortation and organization of the mail pieces is typically performed manually, for example, by postal employees who literally read the destination address information and sort the mail pieces into "pigeon holes" according to delivery route and sequence along the route. It is not difficult to appreciate that such manual handling is extremely costly. By comparison, an incoming hub that can perform automated sortation down to delivery sequence eliminates the need for an enormous amount of manual effort. For instance, where fully refined sortation is performed at the incoming mail center, mail is bundled and loaded on transport vehicles with individual mail pieces arranged in the order in which they are to be delivered within a sub-sector of a sector of a particular town (or five-digit service area). When mail thus sorted arrives at the appropriate local branch office, it is simply unloaded and placed upon the appropriate delivery vehicles either without the need for any further sorting or with minimal separation and organization. A mail delivery person then drives and/or walks his or her routes and delivers the prearranged mail.

In a system that does not distinguish among the sorting refinement capabilities of disparate hubs, the system-wide assumption is that every incoming mail center has full sortation refinement capability in order to realize the benefits of incoming mail centers capable of fully refined mail sorting. Accordingly, machine and human resources are needlessly dedicated to full address interpretation down to delivery sequence, for instance, for billions of mail pieces destined for incoming mail centers that cannot make use of the full string of resolved information. Obviously, such processing is inefficient.

Accordingly, there exists a need for a system of address processing that discriminates among plural incoming mail centers to which mail pieces are destined on the basis of the sortation refinement levels to which the various incoming mail centers can sort and bundle mail for further distribution.

Another problem associated with current postal address interpretation methods and architectures is that they rely on first-come, first-served processing of destination address images. That is, as images of destination addresses are captured and stored in memory, they are generally resolved (interpreted) in the order in which they were captured. Absent a method of prioritizing workflow in accordance with when the resolved images are needed, physical mail processing cannot proceed until all images complete address interpretation. This results in large, costly "spikes" in required automatic and manual address interpretation resources.

Consequently, there exists a need for a method of prioritizing address resolution in accordance with when the resolved address data is required rather than on a first-come, first-served basis.

SUMMARY

In one aspect, the present invention concerns a method and architecture for improving the efficiency with which postal personnel and equipment are utilized. Although the invention is particularly well suited for use within the postal system, it will be appreciated that its scope and application of uses are not so limited. For instance, implementations of the invention could be utilized by parcel delivery services other than the U.S. or foreign postal services. Accordingly, terms such as mail piece, mail center etc. should not be interpreted so narrowly as to limited them to their literal meanings in association with the U.S. or foreign postal systems. In general terms, any item that undergoes transport from an origin to a destination through an organized sort and delivery system can be considered a mail piece for purposes of this specification and the appended claims. Additionally, the place at which the item is received into the system, the final depot responsible for its delivery to an addressee, and each intermediate-handling center responsible for some aspect of its routing, sorting, tracking and transport can be considered a mail center. Furthermore, although the present process and architecture are broadly implementable, the discussion and examples illustrating their implementation are presented primarily in the context of the sorting and movement of mail within and between postal hubs of the U.S. Postal Service.

Various embodiments, versions, aspects and implementations of the invention may include one or more of the following features.

In one aspect, a mail piece including a delivery address field is received at an outgoing mail center. In one version, first and second address portions are attributed to the address field. The first address portion includes sufficient information to route the mail piece to an incoming mail center while the second address portion includes sufficient information to further route the mail piece from the incoming mail center to an addressee from the incoming mail center. For example, the second address portion could include town name, street name, house or unit number, and addressee name information and/or subsequent postal code digits beyond those required to identify the incoming mail center. Examples of the latter postal code information include (i) the fourth and fifth digits of a five-digit ZIP Code, which would typically identify a town or a single local postal branch office serviced by a particular incoming mail center; (ii) the first seven digits of a ZIP+4 digit postal code, which may identify a sector of a town; (iii) the eighth and ninth digits of a ZIP+4 postal code, which may identify a sub-sector within a sector and (iv) the tenth and eleventh digits of a ZIP+4+2 digit postal code, which may identify a single house or mailbox along a postal delivery person's mail route within a particular sub-sector of a sector within a town. Regardless of the attribution of address portions, the delivery address is resolvable by human beings and/or by automated address interpretation equipment and associated algorithms, for example, to varying degrees of "depth." The greater the depth to which the delivery address is resolved (i.e., interpreted) at any given point in time, the closer to the actual delivery point (e.g., a mailbox) the physical mail piece can be transported on the basis of that resolution. For example, on the basis of a ZIP+4+2 postal code alone, a mail piece can be automatically sorted and bundle for delivery to an individual house along a delivery route.

For tracking and information-associating purposes, a unique identification mark such as a bar code, for example, is associated with the mail piece. The identification mark is physically applied to the mail piece using ink or a sticker including the identification mark, for instance. Furthermore, a record is maintained, independent of the marking on the mail piece, associating the unique identification mark and the destination address information. This record is typically maintained in the memory of a computer in association with a stored address field image in a mail piece electronic folder, for example, as explained further in this description. The unique identification mark on the physical mail piece and the computer memory record of the unique identification mark permit the physical mail piece to be associated with stored computer data relating to the mail piece throughout the sorting and transporting process. In one version, the unique identification mark is in the form of a bar code printed on the mail piece. For example, letter-envelope mail pieces currently passing through sorting equipment of the U.S. Postal Service typically bear a unique identification mark in the form of a phosphorescent orange bar code on the rear side of the mail piece.

On a first pass, for example, the delivery address field is resolved (i.e., interpreted) at least to a depth sufficient to determine the incoming mail center for which the mail piece is bound. The resolution of the delivery address field is typically performed with the aid of a computer including OCR (optical character recognition) equipment and an associated address interpretation program. For instance, an image of the destination address field is captured by an image capturing apparatus (e.g., OCR equipment) and stored in the memory storage device of a computer. An address interpretation program analyzes the stored destination address field image according to a set of algorithmic instructions. In a typical version, the address field is analyzed and interpreted in an order from less specific address information to more specific address information; for instance, from (i) incoming mail center to (ii) destination town and/or five digit zip to (iii) street and/or sector digits to (iv) house/apartment number and/or delivery sequence digits, etc. The analysis of the address field image results in one or more sets of sortation signals (e.g., alphanumeric string or strings) which are sent to one or more sets of mechanical sorting apparatus that convey, route and sort the mail piece in response to the sortation signals. Automated address interpretation of a single address field image may alternatively be completed all at once or in stages according to programmed instructions. Furthermore, address interpretation can be delayed in whole or in part accordingly to predetermined deferral parameters. As the address field image is interpreted to produce sorting signals, the sorting signals are typically stored in association with the address field image in computer memory (e.g., in the mail piece computer-memory folder corresponding to a physical mail piece).

In one version using multi-stage processing of address field images, the captured address field image is resolved to a first depth sufficient to generate a first set of sortation signals representative of the incoming mail center. The physical mail piece is sorted at the outgoing mail center for transport to the incoming mail center in response to the first set of signals. Subsequently, the image is re-queued so that the address interpretation program can resolve the remaining required address information for use by machinery at the incoming mail center.

A predetermined "depth value" is associated with each incoming mail center to which the outgoing mail center transports mail pieces. The depth value is indicative of the maximum depth to which captured destination address field images corresponding to physical mail pieces destined for each incoming mail center are to be resolved before cessation of resolution. The depth value assigned to an incoming mail center corresponds to the level of refinement to which mail pieces are sorted at the incoming mail center with the aid of automated sorting machinery. For instance, as previously indicated, one incoming mail center may have automated equipment that assists in sorting mail down to a five-digit level (e.g., town) within its service area while another may be equipped to sort mail with automated assistance down to a delivery sequence. Once the stored destination address image is resolved at least deeply enough to identify a single incoming mail center, the corresponding depth value for that incoming mail center is referenced by the address interpretation program and instructs the address interpretation program when to cease address resolution on the image. In a typical version, depth values for plural incoming mail centers are stored in a "coding depth file." In alternative versions, a coding depth file (or "CDF") includes various data relating to each incoming mail center included in the CDF.

The association of a depth value with each incoming mail center according to its automation capabilities distinguishes incoming mail centers in a significant way. One advantage of terminating address interpretation in accordance with an assigned depth value is that computer processing resources are not needlessly dedicated to the interpretation of information and the production of sortation signals that a particular incoming mail center cannot make use of. A more profound advantage, however, is the reduction of needless human intervention in the address interpretation process. For instance, during automated sortation, sorting machines currently reject mail pieces whose address field images cannot be fully interpreted by an address interpretation program. This may occur for a number of reasons including "illegible" (i.e., uninterpretable) handwriting. Sorting machines route rejected mail pieces to a "reject" bin, for example. In a typical scenario, human beings stationed at workstations manually inspect rejected mail pieces. These inspectors, at least some of whom are referred to as "video coders," read the delivery addresses and attempt to interpret them. A workstation includes a computer terminal and an OCR scanning device that are communicatively linked to the central computer system in which mail piece computer memory folders are stored. A workstation employee scans the unique identification mark on the physical mail piece to call up the mail piece computer-memory folder corresponding to the physical mail piece. The data already of record corresponding to the mail piece is displayed on a workstation computer screen, for example. Address fields also appear that may include any already-resolved address data. The workstation employee manually types into the appropriate fields displayed on the screen information that he or she is able to resolve by human inspection. This manually-entered information is then associated with and becomes part of the mail piece computer-memory folder corresponding to the mail piece. Furthermore, the manually entered information can be converted to sortation signals. The physical mail piece is then re-fed into the automated sorting apparatus for automated sortation in the normal course. Although video coders and other rejected-mail workstation personnel perform an important task, it is wasteful of costly human resources for them to perform needless human inspection and data entry.

In one aspect, the "depth value" assignment feature of the present system reduces needless human intervention. For example, consider a mail piece destined for an incoming mail center that can only make use of sortation signals resulting from address interpretation out to the five-digit ZIP or town name. If the automated address interpretation program can resolve the corresponding address field image out to that depth, there is no need for the sorting machine to reject the physical mail piece for failure of the system to be able to resolve further; the system is in possession of all the information required to send that mail piece on to the incoming mail center and for the sorting apparatus at the incoming mail center to sort it according to the maximum automated sorting capability of the incoming mail center. In the absence of the "depth value" that indicates to the computer system that the maximum useful automated address interpretation has occurred, the mail piece of this example would be rejected. A human video coder would then engage in the aforementioned manual data entry process to enter data that is unnecessary and unusable. For instance, it would be useless in this example for the inspector to enter $6^{th}$ through $11^{th}$ digit code data or street name and house number data. Furthermore, delay in the delivery of the physical mail piece will have been incurred to acquire the unneeded data entry. Delivery delays for multiple mail pieces can themselves result in costly backlogs.

Regardless of whether automated address interpretation is single stage or multi-stage, once sufficient address interpretation has been performed to identify a single incoming mail center, address interpretation is performed to a second depth not exceeding the depth indicated by the depth value to generate a second set of sortation signals. The second set of sortation signals is associated in computer memory with the computer memory record of the unique identification mark corresponding to the physical mail piece in the mail piece computer-memory folder, for example. In at least one implementation, resolution to a second depth is performed in two or more temporally separated stages, for example, depending on when in time in the physical transport and sorting of the mail piece each subsequent stage of image resolution is required.

The physical mail piece is transported from the outgoing mail center to the incoming mail center.

The second set of sortation signals is rendered accessible to the incoming mail center. This may occur in any of a number of ways. For example, in one version, address interpretation is completed at the outgoing mail center and the resulting sortation signals are communicated to the incoming mail center. In another version, the mail piece computer-memory folder is communicated to the incoming mail center with the stored address field image, and address interpretation is completed at the incoming mail center to produce the necessary second set of sortation signals. In still another illustrative version, mail piece computer-memory folders are communicated to a third, intermediate facility where the images are interpreted to produce second sets of sortation signals. The sortation signals, and at least the associated computer memory record of the unique identification mark, are then communicated to the incoming mail center via a communications link. The communications link could include electromagnetic waves and associated transmission and reception apparatus, fiber optic signal-transmission media and/or electrically conductive wires, for instance.

Once the physical mail piece is received at the incoming mail center, it is identified and associated with the second set of sortation signals corresponding to the mail piece by, for example, scanning or reading the unique identification mark on the physical mail piece with an OCR scanning device. Scanning with the OCR scanning device calls up the computer memory record associated with the mail piece.

The second set of sortation signals is used by the automated sorting machinery at the incoming mail center to control the sortation of the corresponding mail piece. That is, the mail piece is sorted at the incoming mail center in response to the second set of sortation signals that have been "called up" and associated with the mail piece. As explained in more detail in the detailed description in conjunction with the drawings, each subsequent level of refinement in the sorting process generally occurs in subsequent mail sorting "passes" of a mail piece. For example, on a first pass, mail pieces are sorted to five-digit area; on a second pass, all mail pieces bound for a particular five-digit area are separated from one another and grouped according to a sector in the five-digit area; on a third pass, all mail pieces bound for a particular sector are separated and arranged according to delivery sub-sector within the sector and, on a fourth pass, mail pieces bound for a sub-sector are arranged according to delivery sequence. Each subsequent sort pass requires a sortation signal resulting from a deeper degree of resolution of an address field image. Because each sort pass in the physical sorting process of a mail piece is temporally separated from the other sort passes for that mail piece, image resolution to a second depth can occur in multiple stages, each deeper stage of resolution corresponding to a more refined sort pass. Each sortation signal corresponding to a level of physical sortation refinement needs to be available by the time the corresponding mail piece is ready for physical sortation at that refinement level. However, in such a sortation system, there is no need for image resolution to have occurred to a depth greater than is "currently" needed. This fact is leveraged in one or more implementations in which resolution to a second depth is performed in two or more temporally separated stages, for example, depending on when in time in the physical transport and sorting of the mail piece each subsequent stage of image resolution is required.

In an alternative version of a coding depth file, distinctions are made among distribution points (e.g., five-digit local branch offices) to which an incoming mail center sends mail pieces. For instance, within an incoming mail center with maximum overall automated sorting capability to a depth of delivery sequence, the delivery sequence level of automated sortation may be available for some five-digit areas serviced by the incoming hub, but not others. For example, the towns of Littleton and Groton, Mass. are both serviced by the Worcester Mass. mail center. When the Worcester hub serves in its capacity as incoming mail center, it may be equipped to sort Littleton mail down to delivery sequence, but Groton mail only down to five-digit area. In one version, this difference is accommodated by a coding depth file that assigns a primary (or default) depth value to the Worcester hub, but also assigns secondary depth values reflective of the sortation refinement levels corresponding to five-digit areas within the service area of the Worcester hub for which the sortation refinement level is not reflected by the default depth value. The maximum depth to which address interpretation is performed for incoming mail at the Worcester hub identifies delivery sequences within subsectors within sectors of a five-digit region, for example. However, this would be unnecessary in the case of mail bound for Groton and, accordingly, the secondary depth value would cause automated address interpretation to cease at the five-digit depth for Groton-bound mail. Additional details of illustrative coding depth files are discussed in the detailed description and depicted in the accompanying drawings.

As mentioned previously, another method of optimizing machine and human resources involves deferring tasks according to when they need to be performed, rather than on a first-come, first served basis regardless of when results are required.

One method for deferred processing of a mail piece including a delivery address through first and second mail centers includes the following steps.

A mail piece having a first address portion including sufficient information to route the mail piece to an incoming mail center, and a second address portion including sufficient information to further route the mail piece for delivery to an addressee from the incoming mail center, is received by an outgoing mail center. In a typical version, the outgoing and incoming mail centers are postal hubs uniquely identifiable upon resolution of only the first three or four digits of a five-digit ZIP Code, as previously discussed. In such a version, postal employees transport mail pieces from local post office branches to the outgoing mail center.

The first address portion is resolved to determine the incoming mail center for which the mail piece is bound. Again, the resolution will typically be performed with the aid of a computer including OCR scanning equipment and an interpretation program. For tracking and information-associating purposes, a unique identification mark such as a bar code, for example, is associated with the mail piece. The identification mark is physically applied to the mail piece using ink or a sticker including the identification mark, for instance. Furthermore, a record is maintained, independent of the marking on the mail piece, associating the unique identification mark and the first and second address portions. This record is typically maintained in the memory of a computer.

The mail piece is physically sorted at the outgoing mail center based on the resolved first address portion to an appropriate transport vehicle bound for the incoming mail center. Although the first three or four digits of a U.S. five-digit destination ZIP Code is typically sufficient to sort a mail piece to the appropriate transport vehicle at the outgoing mail center for transport to an incoming mail center, alternatively, the city and state might be relied upon. The city and state may also be relied upon when, for instance, a ZIP Code has been omitted or when the ZIP Code is incorrect or unrecognizable. As previously mentioned, analogous implementations within the scope of the invention may be applied in countries other than the United States. In foreign countries, information analogous to U.S. Zip Codes (e.g., postal codes), may be analyzed, for example.

In an implementation, data is maintained relating the outgoing mail center and the incoming mail center. More specifically, in one version, at least a predetermined transport time indicative of the time required for an item of mail of the same class as the mail piece to be transported between the outgoing and incoming mail centers is maintained (e.g., stored in a "look-up" table in computer memory). In one or more implementations, such a "look-up" table is incorporated into a coding depth file. The time required for transit may depend on such factors as the time of year and even the time of departure of the mail piece on a particular day of the week. Accordingly, this data may be periodically or constantly updated, particularly if plural mail pieces are tracked and their transit times are calculated, recorded and averaged by a computer, for example. In alternative versions, transport-time data for every mail piece bound for an incoming mail center from an outgoing mail center is tracked or such data can be tracked intermittently. For example, every third or fifth mail piece bound for a particular incoming mail center might be tracked for transport time. By automatically tracking such information and storing it in a data processing system, for instance, real time statistical data can be compiled, maintained and made accessible to either or both of the outgoing and incoming mail centers. Such data can be used at the outgoing mail center in order to constantly or periodically update the "deferral times" discussed immediately below. The incoming mail center could use the data, for example, to prepare resources for a particular volume of work during a particular window of time.

Based on maintained travel-time data, for example, a deferral time is assigned and associated with a mail piece depending on the outgoing mail center from which a mail piece originates and the incoming mail center for which it is destined. Other factors reflected in a deferral time may include, for instance, (i) the class of mail in question, (ii) intrafacility processing time between sort passes and (iii) whether manual processing is required, by way of non-limiting example. A predetermined deferral time represents, for example, a maximum length of time that can elapse from some established point in time in the processing of the mail piece before the second address portion is resolved and rendered available to the incoming mail center for use in further sorting the mail piece to an addressee. Alternatively, the deferral time can represent a minimum elapsed time before resolution and availability of the second address portion is required. Another alternative is to provide a range (i.e., a time window) whose end points are minimum and maximum deferral times. As an example, a computer instruction may read "defer for no less than 48 hours and no greater than 71 hours" (e.g., 48 hrs<deferral time<71 hrs). Although not required, it is advantageous to express the deferral time in terms including at least a maximum time; by including a maximum elapsed time, the required information will not arrive later than it is needed at the incoming mail center. Contrarily, if the deferral time is expressed only in terms of a minimum elapsed time, processing will be delayed for at least that minimum amount of time, but could be delayed longer than desired, resulting in a backlog of unsortable mail at the incoming mail center. The established point in time from which the deferral time begins to run could be the departure time of the transport vehicle or the time the mail piece is marked with the unique identification mark and the record of the identification mark and first and second address portions recorded, for example.

Fluctuations in acceptable deferral times may exist for different times of the year, week or even the day. Another factor is the mode of transportation by which a mail piece is to be transported. By maintaining statistical data relating to transit times, deferral times can be adjusted continuously and/or periodically based on such data. For example, an acceptable maximum deferral time for a mail piece departing from an outgoing mail center in Boston on a Tuesday in August, and bound for Los Angeles, may be 70 hours, while an acceptable deferral time for the same mail piece departing on a Thursday in mid-December may be 90 hours. Maintaining and consulting real-time transit data facilitates the adjustment of deferral times to reflect current conditions in the handling of mail between two or more mail centers, thereby adding an additional dimension of efficiency.

A record of the unique identification mark is transmitted, and at least the resolved second address portion is made available to the incoming mail center in association with the unique identification mark within, for example, an elapsed time not exceeding the maximum time expressed in a deferral time. When implemented with the aid of a computer system, this information can be stored and associated in a mail piece computer memory folder and/or data block. In this way, the resolved second address portion can be "matched" (i.e., re-associated) with the physical mail piece at the incoming mail center and the mail piece routed for delivery to an addressee.

In alternative versions, the second address portion is resolved, for example, at the outgoing mail center, the incoming mail center or at some third location such as a central or regional computer network and/or employee center to which both the outgoing and incoming mail centers are communicatively linked. Regardless of the particular location of resolution, an important factor is that second address portions, or the various portions thereof, are interpreted and rendered accessible to the incoming mail center when needed. The transmission and resolution of the information required by the incoming mail center can be performed while the mail piece is in transit between the outgoing and incoming mail centers.

The foregoing examples having focused on the deferred processing of individual mail pieces, plural mail pieces are processed through an outgoing mail center and various respective incoming mail centers, depending on respective destinations, according to one or more versions of a method for deferred processing generally as follows.

A plurality of mail pieces is received at an outgoing mail center. Each mail piece of the plurality has a destination address field with a first address portion including sufficient information to route the mail piece to its respective incoming mail center and a second address portion including sufficient information to further route the mail piece for delivery to an addressee from the respective incoming mail center, as generally described in previous examples.

An image is captured of the destination address field of each mail piece of the plurality of mail pieces at the outgoing mail center and the image corresponding to each mail piece is stored in computer memory. "Computer memory" may include primary storage devices such as RAM or hard drives, or secondary devices such as magnetic disk, magnetic tape, CD, etc., by way of non-limiting example. The captured image corresponding to each mail piece includes a first address portion image corresponding to the first address portion of the destination address field on the mail piece and a second address portion image corresponding to the second address portion of the destination address field on the mail piece.

Each mail piece is marked with a unique identification mark representing its identity and a computer memory record of the identification mark is stored in association with the stored image of the destination address field corresponding to that mail piece.

The first address portion image corresponding to each mail piece is resolved to generate a first signal representing the respective incoming mail center for that mail piece and each mail piece of the plurality of mail pieces at the outgoing mail center is sorted in response to the first signal corresponding to that mail piece for transport to the respective incoming mail center for that mail piece.

Data is maintained relating the outgoing mail center to each respective incoming mail center. The data reflects at least a predetermined transit time indicative of the time required for a mail piece to be transported from the outgoing mail center to each respective incoming mail center.

Each mail piece of the plurality of mail pieces is transported from the outgoing mail center to its respective incoming mail center.

The second address portion image corresponding to each mail piece of the plurality of mail pieces is resolved to generate a second signal representing the information necessary to further route the mail piece for delivery to an addressee from its respective incoming mail center and the second signal corresponding to each mail piece is rendered accessible to the respective incoming mail center for that mail piece.

The order in which second signals corresponding to mail pieces of the plurality of mail pieces are at least one of (i) generated and (ii) made accessible to the respective incoming mail centers is prioritized in accordance with when the second signals are required by each of the respective incoming mail centers, depending on the maintained data relating the outgoing mail center to the respective incoming mail centers.

Each mail piece is received at its respective incoming mail center and identified by reading the unique identification mark thereon, and the mail piece is associated with the second signal corresponding to that mail piece.

Each mail piece is then sorted at its respective incoming mail center in response to the second signal corresponding to that mail piece for delivery to the addressee.

An advantage of deferring selected portions of processing in general accordance with one or more of the foregoing methods is that resources, whether human or computer based, can be more efficiently utilized by selective allocation as required. For instance, it is not required that the second address portion of a mail piece be resolved and made available any sooner than that information is needed at the incoming mail center to further sort the mail piece for final delivery. Therefore, rather than dedicating resources at the outgoing mail center to full address resolution for each mail piece on a first-come, first-served basis, for example, resources can be more efficiently utilized by resolving only that information that is necessary to route each mail piece to the next stage in its processing.

Secondary address resolution for each mail piece is prioritized relative to other mail pieces according to when resolved secondary address information is needed. For instance, consider first and second mail pieces of the same class entering the postal system through an outgoing mail center in Boston and bound for New York City and Austin, Tex., respectively. The second address portion of the New York City-bound first mail piece will be resolved and made available to the incoming mail center in New York City before the second address portion of the second mail piece is resolved and made available to the incoming mail center in Austin. This example is consistent with the observation that the time required for the first mail piece to reach New York City will generally be less than the time required for the second mail piece to reach Austin. By deferring the processing of information that is not required until a later point in time and, furthermore, processing such further information for plural mail pieces according to the order in which it is required, increased efficiency in the utilization of resources is realized.

Contrarily, in a system that processes address information on a first-come, first-served basis, second portion address information for an Austin-bound mail piece that enters the postal system just prior to a NYC-bound mail piece would have its second portion address information resolved prior to that of the NYC-bound mail piece. Under such a system, something must give. For instance, either unnecessary delay in delivery of the NYC-bound mail piece results or the postal system is required to dedicate inordinate resources to ensure the smooth and timely flow of mail. In either event, efficiency is not maximized.

In another aspect, real time data is used to inform incoming mail centers of the volume of work they can expect at some time in the future. For example maintained data reflective of how many mail pieces bound for a particular incoming mail center are processed at each of a plurality of outgoing mail centers during particular sort shifts can be communicated to the incoming mail center. As a more particular example, the Worcester hub is fed by all outgoing mail centers in the United States on a particular day. In one version, each outgoing mail center maintains data tracking how many mail pieces it processed during a particular time window and for which sort shift at the Worcester incoming mail center they are targeted. This data is communicated from each outgoing mail center to Worcester periodically, or continuously. Management personnel at the Worcester hub can use this data to plan machine and human resource allocation even before the relevant physical mail pieces arrive.

BRIEF DESCRIPTION OF THE DRAWINGS

FIG. 1 shows the front side of a mail piece including a destination address field;

FIG. 1A shows the rear side of a mail piece including a unique identification mark;

FIG. 5B is a portion of an illustrative coding depth file;

FIG. 5C is a portion of another illustrative coding depth file;

FIG. 7 is a portion of a scheduler including a look-up table with deferral times relating an outgoing mail center to various incoming mail centers;

DETAILED DESCRIPTION

Figure 2:
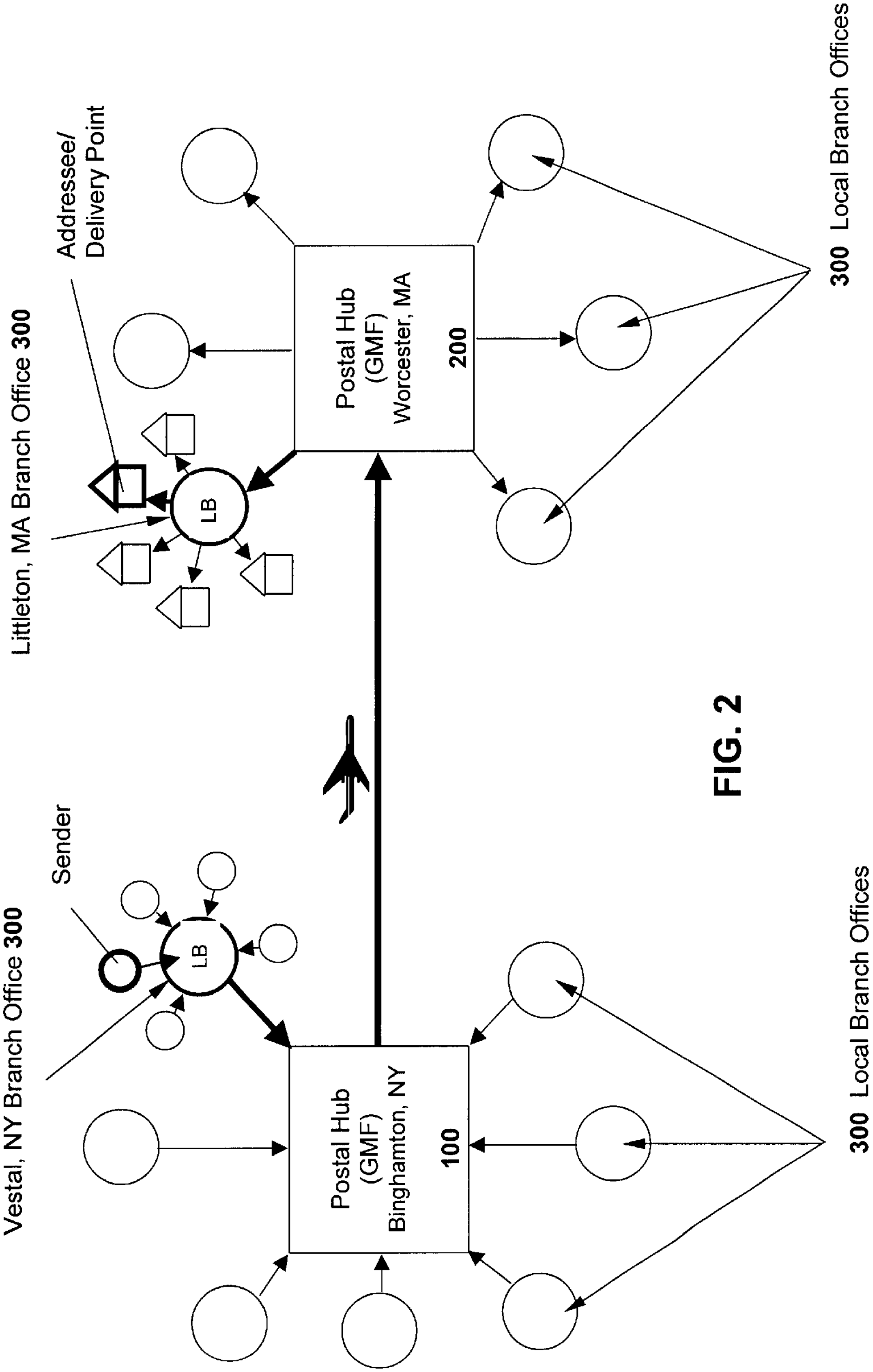
FIG. 2 illustrates the movement of the mail piece in FIG. 1 through outgoing and incoming mail centers of a postal system.

The following description of a postal address process and architecture, and various implementations thereof, is demonstrative in nature and is not intended to limit the invention or its application of uses. Although the process and architecture described herein through various illustrative examples are described in the context of the postal system, they are equally applicable to other systems that receive, sort, distribute and deliver a multitude of items destined for plural delivery points. Examples of such non-postal systems include private couriers and package handling services that compete with the postal system of the U.S. and those of foreign countries.

Referring to FIGS. 1 through 6C, mail pieces 20 are entered into the postal system and received at an outgoing mail center 100. Each mail piece 20 typically includes a delivery address field 22 containing sufficient information to route the mail piece 20 to an addressee at a delivery point.

For the purpose of providing an illustrative context into which the present process and architecture could be incorporated, consider the mail piece 20 of FIG. 1. The mail piece 20 of FIG. 1 is addressed to a Mr. John Adams in Littleton, Mass. Following the movement of this mail piece 20 from its sender in Vestal, N.Y. to its recipient in Littleton provides an illustrative context. In order to distinguish the mail piece 20 of FIG. 1 among other mail pieces 20 in the drawings, this particular mail piece 20 is hereinafter referred to as mail piece 20*x*. The movement of mail piece 20*x* through the postal system is illustrated schematically in FIGS. 2 through 4 and FIGS. 6A through 6C.

In alternative implementations, the delivery address field 22 of a mail piece 20 such as mail piece 20*x* includes a first address portion 24 and a second address portion 26. The first address portion 24 includes at least enough information to route the mail piece 20 for transport to an incoming mail center 200 such as city, state and a five-digit ZIP Code, for example. The second address portion 26 includes more specific information that will be required by the incoming mail center 200 to further route the mail piece 20 to an addressee. For instance, the second address portion 26 may include street, building, apartment or house number, addressee information and/or “plus 4” and “plus 2” ZIP Code digits. In the case of mail piece 20*x*, the second address portion indicates that the mail piece 20*x* is destined for house number 2 on First Street in Littleton, Mass.

FIG. 2 schematically illustrates the overall movement through the U.S. postal system of the mail piece 20x of FIG. 1 in going from Vestal, N.Y. to Littleton, Mass. From a sender, the mail piece 20x is deposited at the local branch office 300 in the town of Vestal. From Vestal, the mail piece 20x is transported to the outgoing mail center 100 at Binghamton, N.Y. From the outgoing mail center 100 at Binghamton, N.Y., the mail piece 20 is transported to the incoming mail center 200 at Worcester, Mass. From the incoming mail center 200 at Worcester, the mail piece 20 is transported to the local branch office 300 in the town of Littleton, Mass. The local branch office 300 in Littleton then delivers the mail piece 20 to the addressee.

Figure 3:
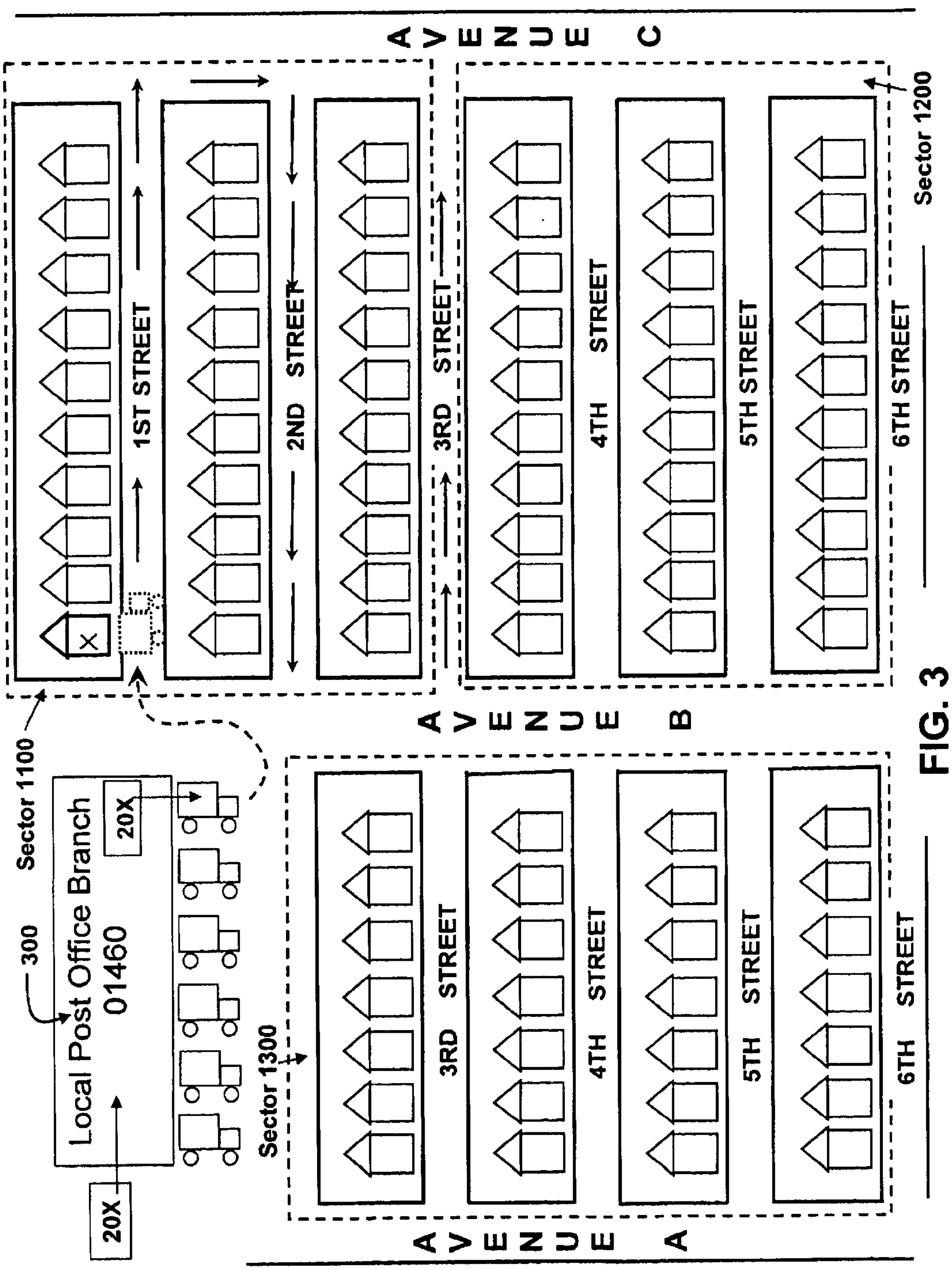
FIG. 3 depicts delivery sectors within a town.
Figure 3A:
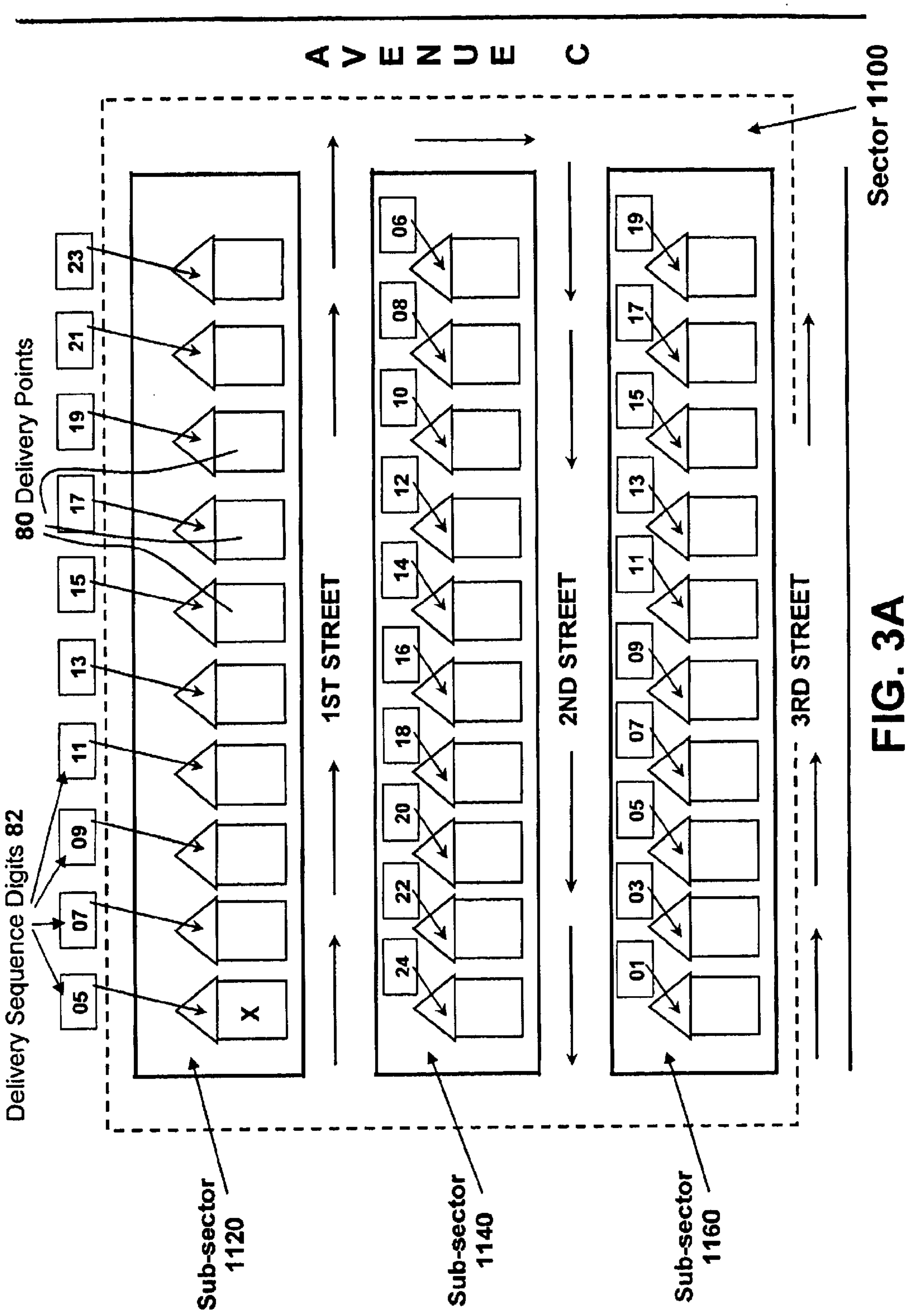
FIG. 3A depicts delivery sub-sectors within a delivery sector of FIG. 3.

FIG. 3 illustrates a portion of the town of Littleton. As FIGS. 3 and 3A illustrate, the town of Littleton is subdivided into delivery sectors and sub-sectors including sectors designated as 1100, 1200 and 1300. Avenues B and C and 1st and 3rd streets bound sector 1100.

FIG. 3A is an enlarged view of sector 1100 showing three subsectors designated as 1120, 1140 and 1160. Also indicated by arrows in both FIGS. 3 and 3A is that portion of a delivery route passing through sector 1100. A row of ten houses (i.e., delivery points 80) along $1^{st}$ Street is within sub-sector 1120. The delivery sequence digits 82 shown in a box above each delivery point 80 in FIG. 3A indicate the order in which mail pieces 20 are delivered to the delivery points 80 within sub-sector 1120. In the particular example of FIG. 3A, the odd numbers between "05" and "23" are used to indicate order of delivery. In the present example, the delivery sequence digits "05" correspond to "2 First Street," which is designated by an "X" in FIGS. 3 and 3A. The house to the right of 2 First Street is the next delivery point 80 and is designated by delivery sequence digits "07" and so on along the portion of the route in sub-sector 1120.

Figure 4:
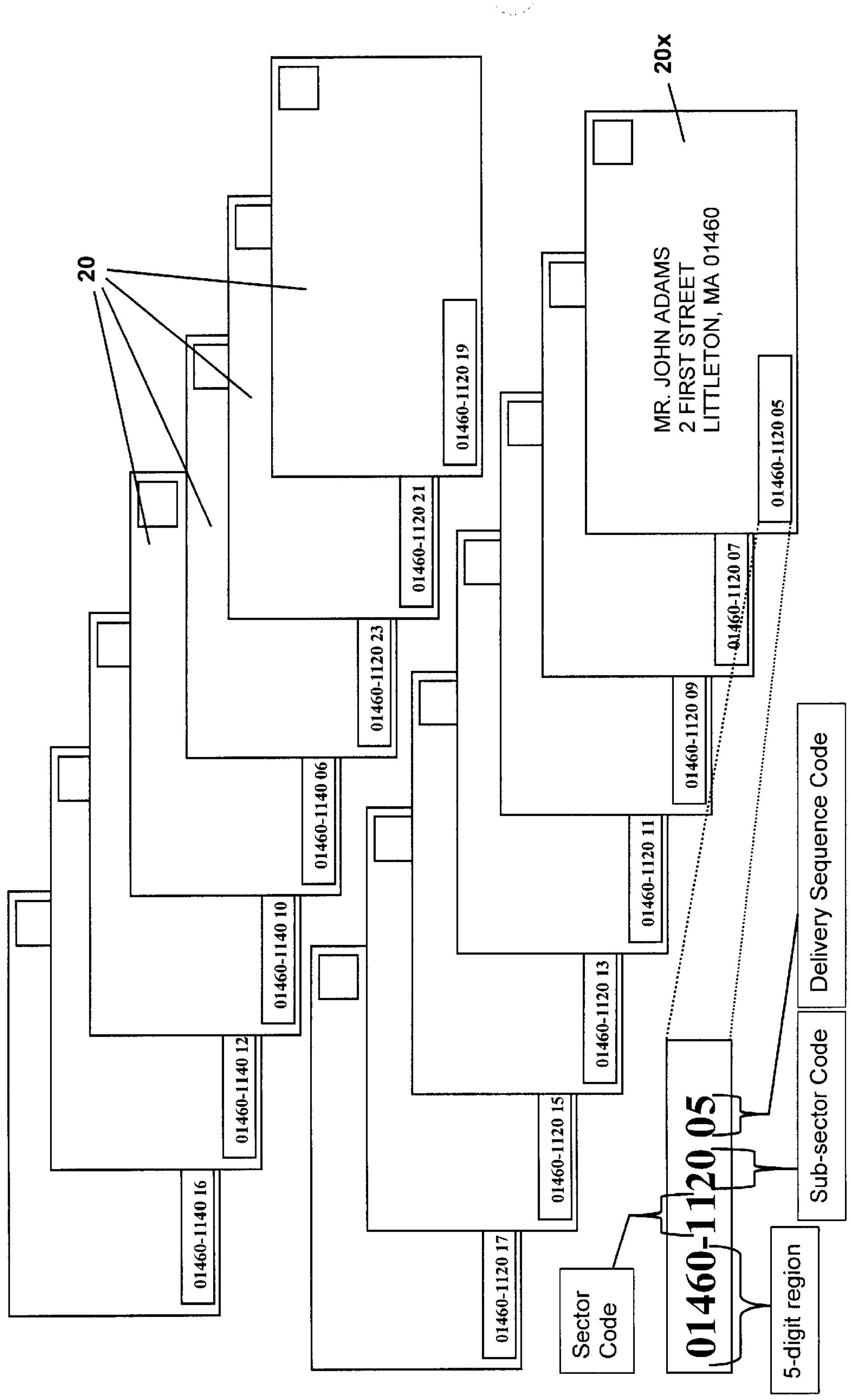
FIG. 4 depicts several mail pieces arranged according to delivery sequence.

Increased efficiency is realized when plural mail pieces 20 are arranged in the order in which they are to be delivered before a delivery person embarks on his or her delivery route(s). FIG. 4 illustrates several mail pieces 20 that have been arranged in the order in which they are to be delivered as indicated by eleven digit codes of the type previously discussed in the background and summary. Among the mail pieces 20 of FIG. 4 is mail piece 20x. As shown, mail piece 20x includes the eleven-digit code corresponding to its intended delivery point 80 adjacent the lower left corner of the envelope. An enlarged image of the eleven-digit code is illustrated to show how the digits correspond to the town, sector, sub-sector and, finally, the delivery point 80 for which mail piece 20x is destined as indicated in FIGS. 3 and 3A. More specifically, the digits in the eleven digit codes on the mail pieces 20 of FIG. 4 represent the following information. The first five digits (standard U.S. ZIP Code) represent the town of Littleton, Mass. (i.e., a delivery region within the service area of the Worcester incoming mail center 200). Of the sixth through ninth digits, the sixth and seventh digits (i.e., "11") represent the section of Littleton designated as "sector 1100." The eighth and ninth digits (i.e., "20") represent the section of sector 1100 designated as "sub-sector 1120." The tenth and eleventh digits represent the order in which this mail piece 20x will be delivered relative to other mail pieces 20 being delivered within the same subsector. The mail piece 20x would be delivered first among the mail pieces 20 of FIG. 4 destined for sub-sector 1120. In this case, and more generally, a mail piece 20 could be delivered to its intended delivery point 80 if the only information on the face of the envelope were the eleven-digit code.

Although each delivery point to which the U.S. Postal Service delivers mail pieces can usually be defined in terms of an eleven-digit code, postal customers do not typically apply to the face of a mail piece 20 the eleven-digit code corresponding to the intended delivery point 80. At best, postal customers indicate the sub-sector for which a mail piece 20 is destined by making use of the more-common nine-digit code (i.e., ZIP +4 code). At present, however, most customers, indicate postal code out to the fifth digit only. Accordingly, the final delivery point of a mail piece 20 is typically determined by some method or methods other than directly reading the appropriate eleven-digit code, at least initially. For instance, automated address interpretation may by performed to resolve all or part of a destination address expressed in terms of state name, town name, street number, house number, etc. In circumstances in which only partial automated address interpretation is possible, the remainder is performed by human inspection, for example. By way of example, consider a system in which automated address interpretation is performed at an incoming mail center 200 to an extent that identifies the sector and sub-sector within a particular 5-digit region for which a mail piece 20 is destined. Such resolution would be sufficient to prepare and transport cases, bins, etc. of mail, each of which corresponds to a sub-sector (e.g., out to nine digits in the U.S. eleven-digit system). From that point, arranging the mail pieces 20 destined for delivery within each sub-sector would require manual sortation by human beings using, for example, the traditional, manual pigeon hole system, as is known in the art.

Figure 5:
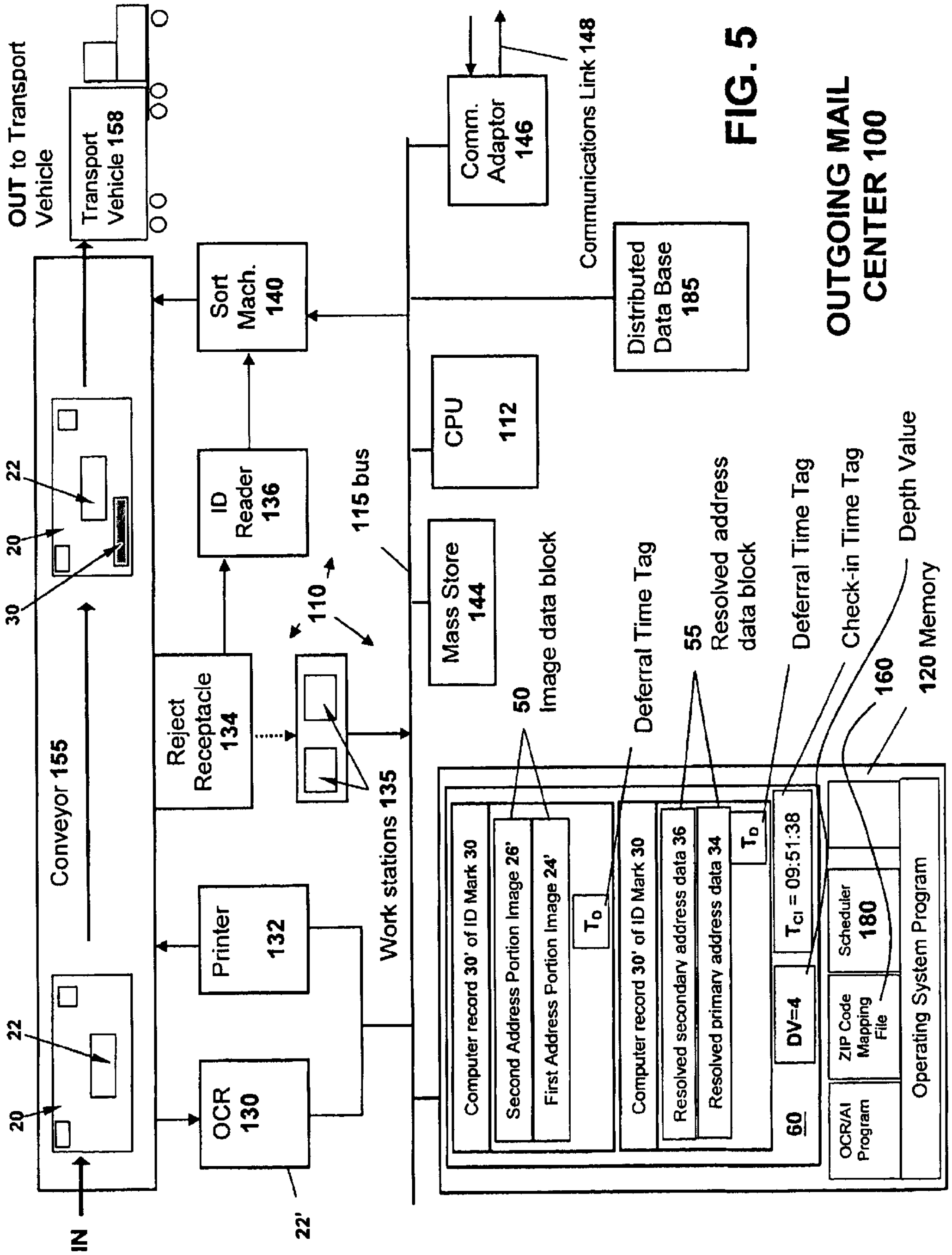
FIG. 5 is an architectural block diagram of an illustrative outgoing mail center.
Figure 6:
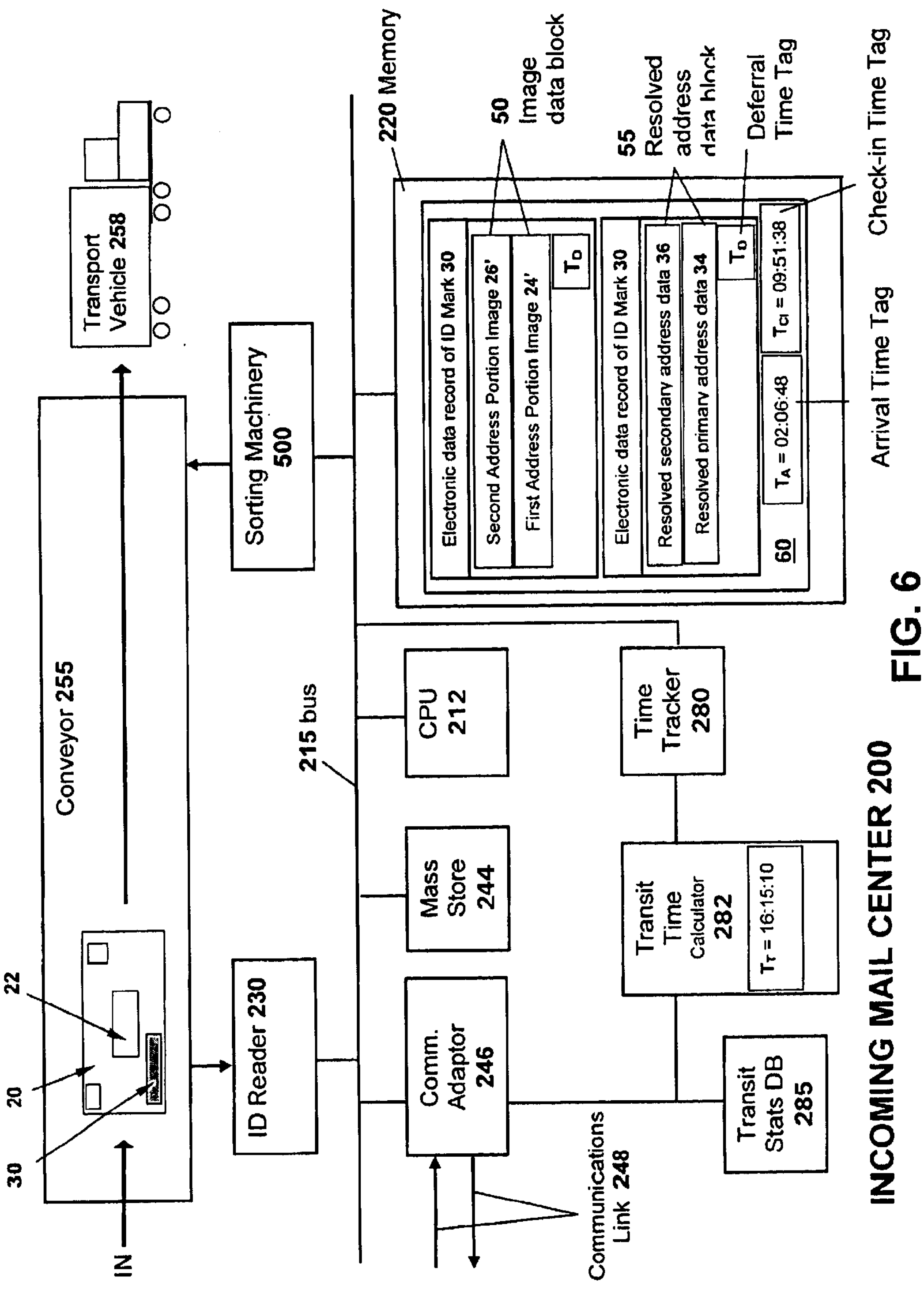
FIG. 6 is an architectural block diagram of an incoming mail center.

In those circumstances in which an automated address interpretation program resolves an address and expresses it in terms of an eleven-digit code, it is not uncommon for the interpreted eleven-digit code, or at least a portion thereof, to be printed on the physical mail piece 20. As shown in FIG. 1, the eleven-digit code corresponding to "2 First Street, Littleton, Mass. 01460" has been printed on the front side of the mail piece 20x as human-readable digits and, to the right of the human readable digits, as a bar code readable by an OCR scanning device. FIGS. 5 and 6 are function-block diagrams of the architecture at an illustrative outgoing mail center 100 and an illustrative incoming mail center 200, respectively.

The outgoing mail center 100 of FIG. 5 includes a data processing system 110. The data processing system 110 includes a central processing unit (CPU) 112 which is connected by a bus 115 to a memory 120, image-capturing and resolution apparatus, such as an optical character recognition machine (OCR) 130, for example, a printer 132, and an identification-mark reader 136. The system architecture further includes sorting machinery 140, a mass store 144 and a communications adapter 146, all communicatively linked by the system bus 115. The communications adapter 146 communicates via a communications link 148 with various incoming mail centers 200 to which the outgoing mail center 100 sends mail for further processing.

At the outgoing mail center 100 of FIG. 5, a mail piece 20 is deposited on a conveyor 155, where it is conveyed passed the OCR 130. The OCR 130 captures 20 an image 22' of the delivery address field 22 from the physical mail piece 20 and stores the captured image 22' as a two-dimensional bit plane of pixels in the mass store 144, for example. A unique identification mark 30 is associated with the captured image 22' and a computer memory record 30' of the unique identification mark 30 is stored in conjunction therewith in an image data block 50 corresponding to the physical mail piece 20. Typically, the identification mark 30 comprises a bar code such as that depicted in FIG. 1A, for example. A printer 132 prints the unique identification mark 30 on the physical mail piece 20. The unique identification mark 30 allows the corresponding captured destination address field image 22' to be accessed and, when necessary, re-associated with the corresponding physical mail piece 20. Although FIG. 5 shows the unique identification mark 30 applied to the front side of the mail piece 20, it may be alternatively applied to the rear side of the mail piece 20 as shown in FIG. 1A.

In one implementation, the captured image 22' includes a first portion image 24' of the first address portion 24 and a second portion image 26' of the second address portion 26. OCR algorithms resolve (or interpret) the captured first portion image 24' into an alphanumeric character string of resolved primary address data 34, for example. In one version, only enough of the first portion image 24' is resolved to ascertain the incoming mail center 200 and route the mail piece 20 to an appropriate transport vehicle 158 at the outgoing mail center 100. Once the OCR 130 has resolved enough of the captured first portion image 24' to ascertain the incoming mail center 200, attempts at further resolution cease until the captured image 22' is subsequently re-queued for further resolution. The resolved first address portion 24 information is stored as resolved primary address data 34 in a resolved address data block 55. Eventually, OCR algorithms attempt to resolve the second portion image 26' and store the results as resolved secondary address data 36 in the resolved address data block 55. In alternative versions, resolution of the second address portion image 26' is deferred in accordance with parameters discussed further in this description. The unique identification mark 30 is also associated with the address data block 55 so that the information in the resolved address data block 55 can be associated (i.e., matched) with the physical mail piece 20. In one version, as shown in FIG. 5, the image data block 50 and the resolved address data block 55 are associated with a computer memory record 30' of the unique identification mark 30 in a mail piece computer memory folder 60.

Figure 5A:
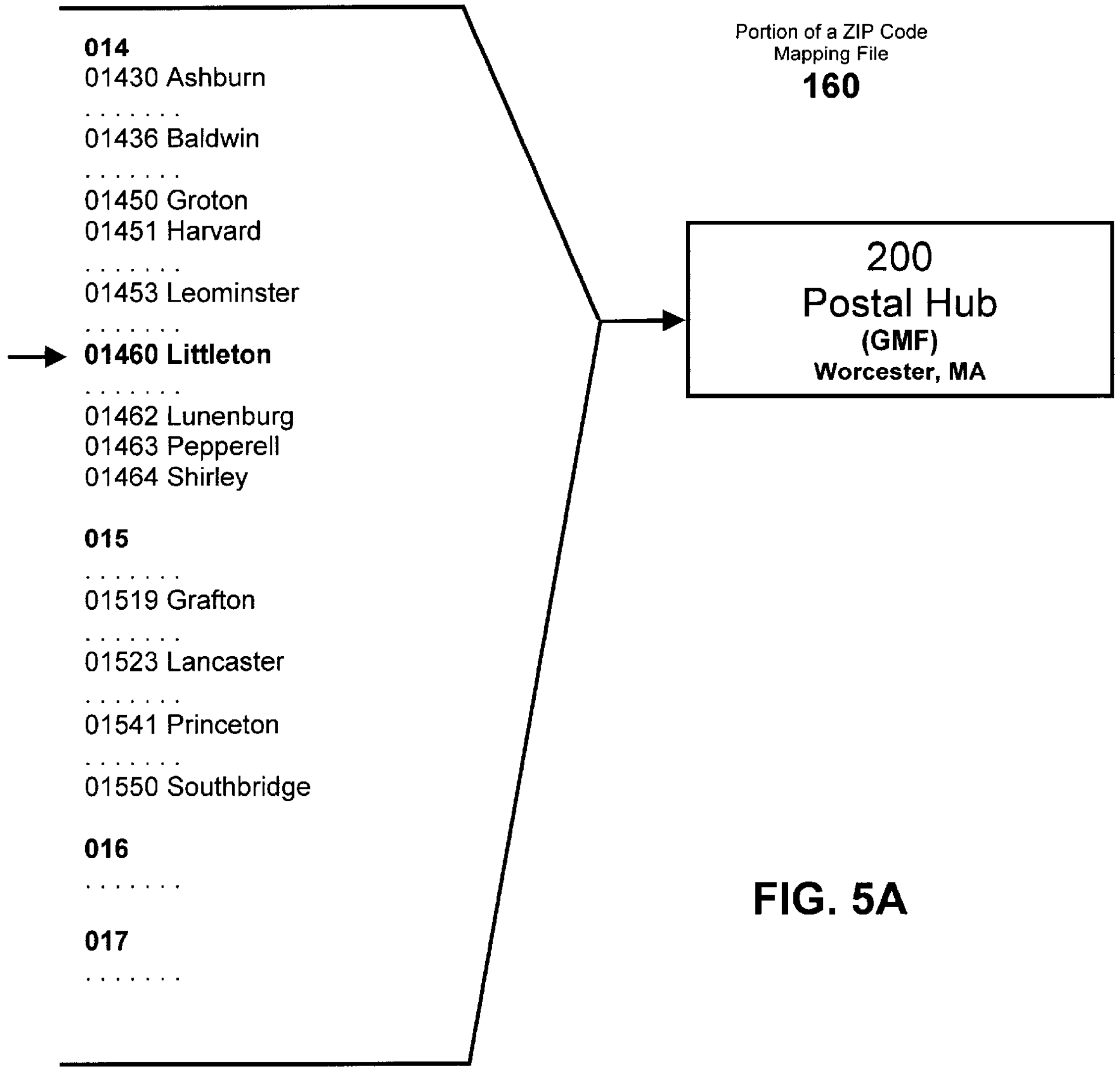
FIG. 5A is a portion of an illustrative ZIP Code mapping file.

In one implementation, a ZIP Code mapping file is consulted in order to identify the incoming mail center 200 for which the mail piece 20 is destined. In another implementation discussed further in this description, ZIP Code mapping data is included in a coding depth file. A ZIP Code mapping file contains information relating to several incoming mail centers 200 such as the five-digit ZIP Code regions serviced by each of the several incoming mail centers 200. FIG. 5A shows a portion of the data included in an illustrative ZIP Code mapping file 160 relating five-digit ZIP Codes and city names to the postal hub (incoming mail center 200) at Worcester, Mass. For example, with respect to the mail piece 20*x* of FIG. 1, the outgoing mail center 100 at which the first address portion image 24' is resolved is the outgoing mail center 100 at Binghamton, N.Y. The incoming mail center 200 is the hub at Worcester, Mass. that handles mail pieces 20 being delivered to all ZIP Codes beginning with "014," "015," "016" and "017" as shown in FIG. 5A. In one version, the OCR 130 at Binghamton begins delivery address resolution by attempting to resolve the five-digit ZIP Code as it appears in the first address portion image 24'. As the information in the first address portion image 24' is resolved, the resulting resolved primary address data 34 is compared to the ZIP Codes appearing in the ZIP Code mapping file 160 using comparitor algorithms. In this example, once the ZIP Code is resolved and "matched" to the third digit (i.e., out to "014"), sufficient resolution has taken place to positively identify a single incoming mail center 200 (i.e, the Worcester hub). In one version (e.g., a version that implements multi-stage image processing), address resolution efforts temporarily cease at this point because the architecture at Binghamton has all the information it requires to mechanically sort the mail piece 20 to an appropriate transport vehicle 158 bound for the incoming mail center 200 at Worcester, Mass. In one or more versions, resolution of the second portion image 26' is deferred and used for further processing as explained later in this description.

Once the incoming mail center 200 is positively identified, the resolved primary address data 34 is output to the sorting machinery 140 and the mail piece 20 is sorted within the outgoing mail center 100 and placed onboard a transport vehicle 158 destined for the incoming mail center 200. The sorting within the outgoing mail center 100 is typically automated with the aid of at least one conveyor 155 and the sorting machinery 140 that receive instructions (i.e., sortation signals) from the CPU 112 based on the resolved primary address data 34. Typically, the sorting machine 140 includes a plurality of pockets (not shown), each of which pockets corresponds to a destination city and/or an incoming mail center 200. Furthermore, each physical slot or pocket in the sorting machinery 140 typically corresponds to a particular mode of transportation such as aircraft, truck or train, for example.

If the resolution and comparitor algorithms detect ambiguity in the ZIP Code on the mail piece 20, or if there is no ZIP Code on the mail piece 20, for example, confirmatory and/or alternative processing of the city and state name information in the first address portion image 24' may begin. If a single incoming mail center 200 cannot be identified upon comparing any part of the first address portion image 24' to the information in the ZIP Code mapping file 160, for example, the sorting machinery 140 routes the mail to a "reject" receptacle 134. From the reject receptacle 134, physical mail pieces 20 are inspected by human personnel who interpret and enter correct address information into the resolved address data block 55 at computer work stations. The personnel at the work stations 135 interpret and enter at least enough information into the resolved address data block 55 to permit automated sortation to an appropriate transport vehicle 158. This manually entered data is processed to produce sortation signals as if sufficient optical character recognition had taken place. For example, the workstation personnel may enter ZIP Code, city and/or state information (i.e., resolved primary address data 34) into the resolved address data block 55. They may also enter secondary address data 36. When a mail piece 20 is sent to the reject receptacle 134 it already has a unique identification mark 30 on it so it can be matched with the computer memory data already in memory 120 and associated with the computer memory record 30' of the unique identification mark 30. In other words, there is already at least a "place holder" in memory 120 that can be associated with the unique identification mark 30 on the physical mail piece 20. In one version, this "place holder" is in the form of a mail piece computer memory folder 60. The mail piece computer memory folder 60 remains in memory 120, ready to receive address information, as it becomes available. Once personnel have entered correct data for rejected mail pieces 20, the unique identification marks 30 on the physical mail pieces 20 are read by an identification reader 136 that is associated with the sorting machine 140 from which they are entered back into the sortation system. Once the mail pieces 20 are scanned by the identification reader 136, the CPU 112 associates the unique identification mark 30 with the corresponding resolved address data entered manually at the workstations 135. This association permits access to the resolved secondary address data 36 so that sorting instructions (i.e., signals) can be sent to the sorting machinery 140 in the ordinary course.

In alternative versions, regardless of whether automated address interpretation is carried out in two or more stages or a single stage for each mail piece 20, automated address interpretation is performed to varying degrees of depth as previously discussed. In one version, the maximum depth to which automated address interpretation is performed on an address field image 22', for example, depends on the incoming mail center 200 for which a mail piece 20 is destined because, as previously stated, different incoming mail centers 200 may be disparately equipped. This is particularly true in countries other than the United States, but it is true here as well.

Referring to FIG. 6, an illustrative incoming mail center 200 includes sorting machinery 500 that sorts mail pieces 20 in response to sortation signals resulting from automated address interpretation. As explained earlier, an incoming mail center 200 that automatically sorts mail pieces 20 to a lesser degree (i.e., level) of refinement does not require as much information in its sorting signals as an incoming mail center 200 that sorts to a greater degree of refinement.

In one version, each incoming mail center 200 of a selected plurality of incoming mail centers 200 to which an outgoing mail center 100 sends mail pieces 20 is distinguished from the others among the plurality by associating a resolution "depth value" with each incoming mail center 200. Each resolution depth value is indicative of the maximum depth to which captured destination address field images 22' are to be resolved before cessation of automated address resolution. The depth value corresponds to the level of refinement to which the associated incoming mail center 200 can sort mail pieces 20. "Depth values" are discussed further following the discussion of an illustrative automated sorting architecture below.

Figure 6A:
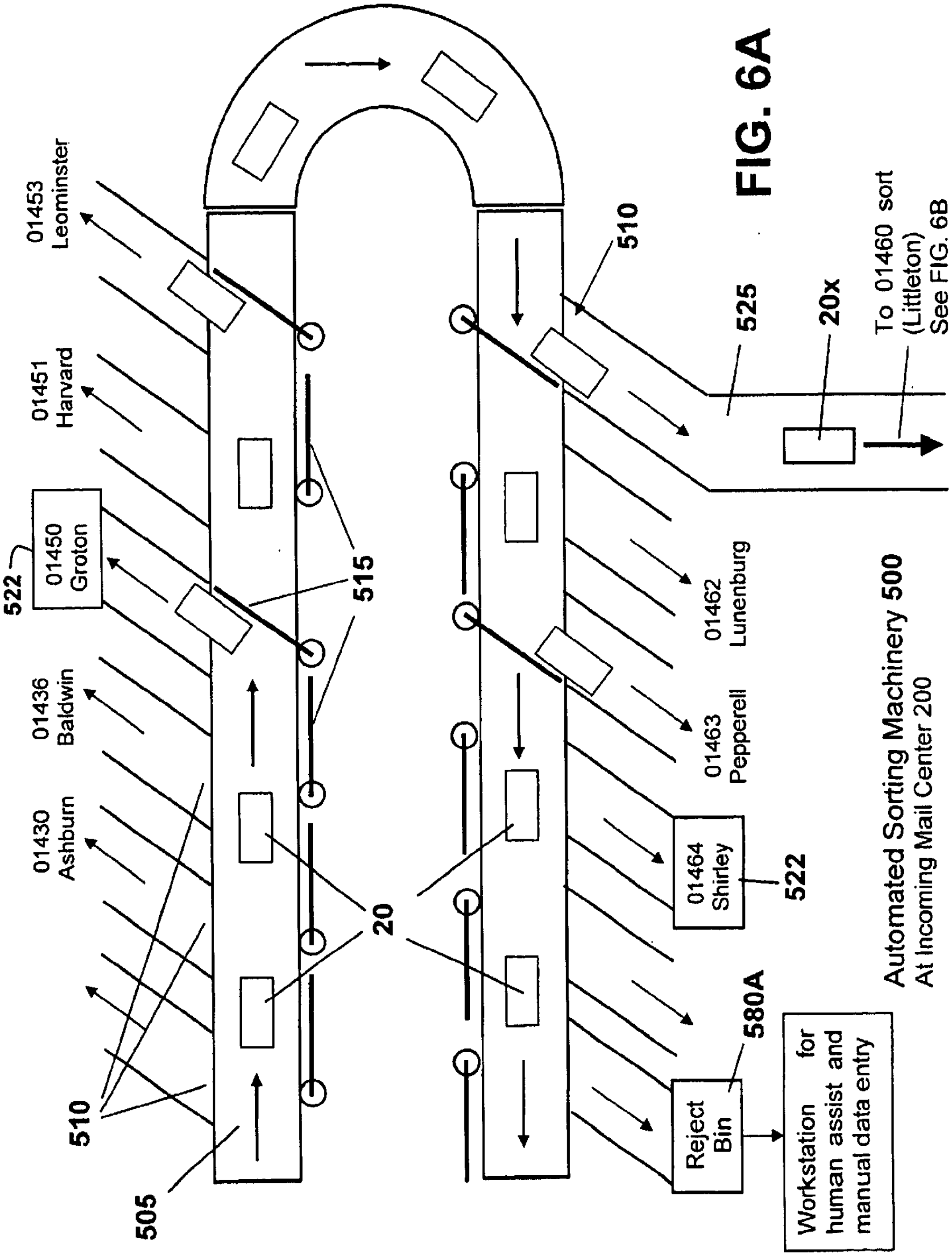
FIGS. 6A through 6C depict illustrative sorting machinery at an incoming mail center.
Figure 6B:
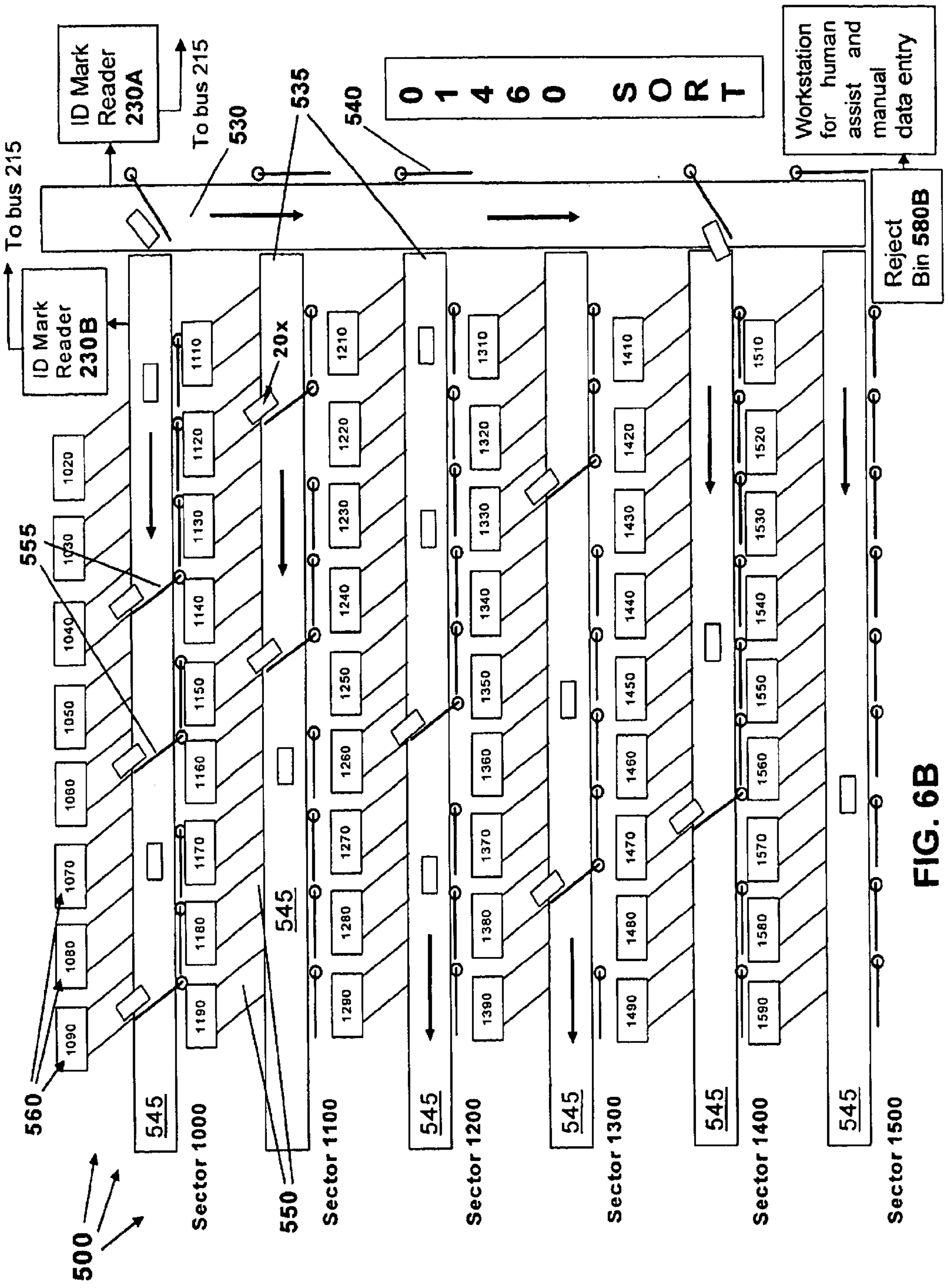
Figure 6C:
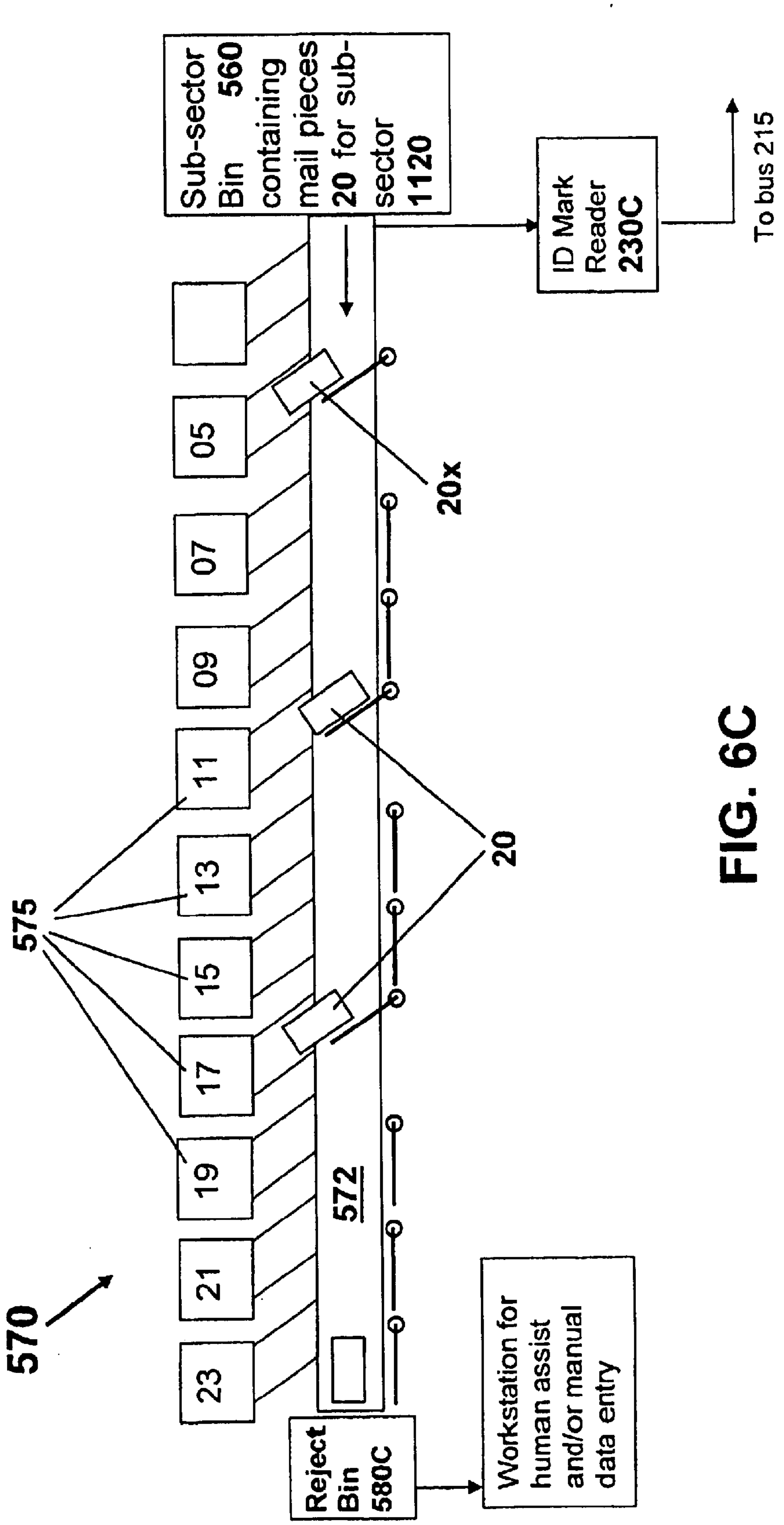

FIGS. 6 through 6C depict an illustrative automated mail-sorting architecture at an incoming mail center 200. Referring to FIG. 6, a physical mail piece 20 arrives at an incoming mail center 200 and an identification-mark reader 230 scans the unique identification mark 30 appearing on the mail piece 20. The CPU 212 at the incoming mail center 200 associates the identification mark 30 as read from the physical mail piece 20 with the corresponding mail piece computer memory folder 60 that is stored in memory 220 and applies this information to send sortation signals to the sorting machinery 500. The sorting machinery 500 further sorts the mail piece 20 to an appropriate transport vehicle 258 for further delivery. When, for example, the incoming mail center 200 is a hub that services several local branch offices 300, mail pieces 20 are sorted at least finely enough to route them to their respective local branch offices 300 and the mail pieces 20 are transported accordingly. Depending on the level of refinement, the mail pieces 20 leaving the incoming mail center 200 for a local branch office 300 may be sorted by region, sector, sub-sector or delivery sequence, for example.

Referring to FIGS. 6A through 6C, illustrative sorting machinery 500 is schematically illustrated. For purposes of explanation, the transport and routing of mail piece 20*x* through the sorting machinery 500 is illustrated. Furthermore, the sorting machinery 500 depicted in FIGS. 6A through 6C is capable of full-refinement sortation down to delivery sequence.

Referring to FIG. 6A, a "first-pass" sort at the incoming mail center 200 is schematically depicted. A first conveyor 505 carries mail pieces 20 destined for various regions (e.g., five-digit areas) serviced by the incoming mail center 200 past drop-off points 510, each drop-off point 510 representing a five-digit area, such as a town. As a mail piece 20 approaches its corresponding drop-off point 510, it is diverted by a diverting arm 515 from the conveyor 505 into a bin 522 or onto a second conveyor 525, for instance. In FIG. 6A, one drop-off point 510 corresponds to Littleton, Mass. (01460). Mail piece 20*x* is depicted on a conveyor 525 permanently or temporarily dedicated to Littleton-bound mail pieces 20.

Littleton-bound mail pieces 20, for example, are subsequently transported to a sorting area dedicated to the further sortation of Littleton-bound mail pieces 20. Referring to FIG. 6B, within the "01460 sort" area, mail pieces 20 are more finely sorted in subsequent sort passes according to delivery sector, delivery sub-sector and, finally, as shown in FIG. 6C, delivery point. In the schematic diagram of FIG. 6B, mail pieces 20 are scanned in a second pass by an identification mark reader 230A to again re-associated them with their mail piece computer memory folders 60 and a conveyor 530 transports mail pieces 20 by sector drop-off points 535. Diverting arms 540 divert each mail piece 20 according to delivery sector based on the stored sortation signals associated with each mail piece 20 as its unique identification mark 30 was scanned by the identification mark reader 230A. From the sector drop-off points 535, conveyors 545, for example, carry mail pieces 20 to sub-sector drop-off points 550. Diverting arms 555 divert mail pieces into bins 560 corresponding to delivery sub-sectors as labeled in response to stored sortation signals. FIG. 6B depicts mail piece 20*x* being sorted to the sub-sector drop-off point 545 corresponding to sub-sector 1120.

Finally, referring to FIG. 6C, the mail pieces 20 for each sub-sector are sorted according to delivery sequence by a delivery sequencer 570. In FIG. 6C, mail pieces 20 are being carried by a conveyor 572 and diverted into delivery sequence compartments 575 in response to sortation signals. In the example of FIG. 6C, mail pieces bound for sub-sector 1120 in Littleton, Mass. are being arranged in delivery sequence. Mail piece 20*x* is shown being diverted into the delivery sequence compartment 575 corresponding to the first delivery point 80 on the delivery route through sub-sector 1120. Once the mail pieces 20 are sorted according to delivery sequence, they are bundled and arranged in delivery-point order like the mail pieces 20 of FIG. 4, for example.

In one implementation, each refinement in the automated sorting process requires an instruction or subset of instructions in the form of a sortation signal. At the incoming mail center 200 of FIGS. 6 through 6C, a mail piece 20, in being refined to delivery sequence, undergoes several "passes." At each pass, an identification mark reader scans the unique identification mark 30 on the mail piece 20. See identification mark readers 230, 230A, 230B and 230C in FIGS. 6, 6B and 6C. This scanning calls up sortation signals associated with the mail piece 20 from the mail piece computer memory folder 60 so that the sorting machinery 500 is instructed as to how to manipulate the mail piece 20. At each subsequent pass, the data processing system is consulted and a "deeper" instruction is provided. That is, the further along in the mail-sorting refinement process, the greater the depth the stored delivery address image 22' will have had to have been resolved in order for an appropriate sortation signal to have resulted. If at any point in the physical sorting process, an instruction is not available for the "current" stage in the process, the mail piece 20 will be rejected and sent to a reject bin, for instance, subsequent to which it will be manually examined and handled as previously described. See, for example, reject bins 580A, 580B and 580C in FIGS. 6A, 6B and 6C.

In one alternative version, an address interpretation program may make more than one attempt to resolve the stored address image 22' in order to resolve the image 22' to the full depth required (i.e., usable) by the incoming mail center 200 for which the corresponding mail piece 20 is destined. Such multi-stage processing has the potential to avoid rejection of mail pieces 20 that would otherwise be rejected. This aspect will be discussed in more detail below in connection with the deferral and multi-stage aspects of a mail sorting and address interpretation process. In general, however, as long as the address image 22' associated with a physical mail piece 20 has been resolved at any given point in time to the depth required for the "current" step in the physical sortation of the mail piece 20, rejection of the mail piece 20 can be avoided by allowing images 22' that have not been fully resolved to be requeued for deeper address interpretation while the physical mail piece 20 is in transit to a subsequent level of refinement.

Although the illustrative incoming mail center 200 of FIGS. 6 through 6C can automatically sort mail pieces 20 down to delivery sequence, at least for Littleton-bound mail pieces 20, an incoming mail center 200 may have the capacity for full-refinement sortation for some regions (e.g., five-digit areas), but not for others, for example. For instance, referring to FIG. 6A, mail pieces 20 bound for Groton (01450) may be diverted into a bin 522 off the conveyor 505 and subsequently sorted manually. Under such circumstances, it is advantageous to distinguish the automated sortation capacity of an incoming mail center 200 for each region within the service area of that incoming mail center 200, for example. Accordingly, in one version, a truncating, "secondary depth value" is associated with each five-digit area for which the maximum refinement capacity of the incoming mail center 200 for that five-digit area is less than the overall maximum refinement capacity of that incoming mail center 200. For instance, as applied to the incoming mail center 200 of FIGS. 6 through 6C, one implementation would associate a truncating, secondary depth value with Groton so that resources are not needlessly dedicated to full-depth, delivery sequence automated address interpretation for Groton-bound mail pieces 20. Another advantage of implementing secondary depth values is that mail pieces 20 are not needlessly rejected for lack of a full-depth sortation signal where, for instance, address interpretation is successful to the maximum usable depth, but not beyond. For example, without the secondary depth value being associated with Groton-bound mail pieces 20, mail pieces 20 whose associated images 22' could not be interpreted beyond a depth corresponding to five-digit area would be needlessly rejected Referring to FIG. 5B, a portion of an illustrative coding depth file 600 includes data relating each of a plurality of incoming mail centers 200 to a depth value 602. Different levels of refinement and corresponding depth values 602 can be defined in any number of ways. The illustrative coding depth file 600 of FIG. 5B is adapted for use in a "four-level system." Referring to the legend of FIG. 5B, the defined levels of sortation in this case are (i) Outward, (ii) Partial Inward, (iii) Full Inward and (iv) Delivery Sequence or Delivery Point. Outward defines the incoming mail center 200. In the United States, this typically translates to the first three digits of the ZIP Code, as previously discussed. In a typical implementation, automated address interpretation down to the "outward depth" occurs while the mail piece 20 is at the outgoing mail center 100 in order to produce a first set of sortation signals sufficient to sort the mail piece 20 to a transport vehicle 158 bound for the appropriate incoming mail center 200. Partial Inward (i.e., level 2) typically defines the delivery office. In the United States, this equates to the five-digit ZIP Code identifying a single local post office branch servicing a town, for example. Full Inward (i.e., level 3) equates to the five-digit plus four code, which would define a sector and a sub-sector of a town, for instance. Delivery Sequence (i.e., level 4) corresponds in the U.S. to the full eleven-digit code. In a typical implementation, physical mail-sorting refinement based on a second set of sortation signals resulting from depth 2, 3 and/or 4 automated address interpretation occurs at the incoming mail center 200.

Referring to the coding depth file 600 of FIG. 5B, sets of ZIP Code ranges in the left column identify unique incoming mail centers 200 identified by name in the center column. In the right hand column is a depth value 602 associated with each of the various incoming mail centers 200. For comparison, consider the incoming mail centers 200 at Springfield, Mass. and Worcester, Mass. The Worcester hub is a full-service, delivery sequence facility for at least one town in its service area as indicated by the fact that its associated depth value 602 is "4." By comparison, Springfield's maximum sortation refinement capability corresponds to a depth value 602 of "3," which means the maximum level of sortation of which it is capable is "full inward," according to the legend in FIG. 5B.

In one implementation, once automated address interpretation is performed on a stored destination address field image 22' to a depth sufficient to identify a single incoming mail center 200 (e.g., the first three postal code digits), the coding depth file 600 is consulted to ascertain the depth value 602 associated with the identified incoming mail center 200. In one version, the depth value 602 is then stored in association with the mail piece computer-memory folder 60 of the mail piece 20. The depth value 602 is essentially a parameter that indicates to the address interpretation program 600 when address resolution operations should cease altogether. Subsequent to the initial address interpretation to a first depth sufficient to identify the incoming mail center 200, address interpretation is performed to a second depth not exceeding the depth indicated by the depth value 602 to generate a second set of sortation signals. The second set of sortation signals can include one or more sortation instructions applicable to one or more different stages (levels) of sortation. In alternative versions, three-digit codes are matched to incoming mail centers 200 (i) in the coding depth file 600 (as shown in FIGS. 5B and 5C) and (ii) in a separate ZIP Code mapping file 160 (as shown in FIG. 4), for example. In a latter version, once a single incoming mail center 200 is identified by consultation of the ZIP Code mapping file 160, the coding depth file 600 is consulted in order to ascertain the appropriate depth value 602.

As previously stated, a particular incoming mail center 200 may be capable of sorting mail pieces 20 destined for different regions (e.g., towns), for example, to different levels of refinement. In one implementation, a coding depth file associates a disparity code with each incoming mail center 200 that does not sort mail pieces 20 to a uniform refinement levels for all five-digit areas for which it handles mail pieces 20, for example. In one version, the disparity code indicates that address interpretation beyond that required to identify the incoming mail center 200 needs to be performed in order to identify the five-digit area for which the mail piece 20 is bound. Referring to FIG. 5C, a portion of an alternative coding depth filing 620 includes data relating secondary depth values 622 to five-digit areas for which the refinement level of automated sortation at the corresponding incoming mail center 200 is less than the overall maximum refinement level of which the incoming mail center 200 is capable. For example, the partial coding depth file 620 of FIG. 5C depicts seven incoming mail centers 200. In this example, only the incoming mail center 200 at Worcester, Mass. has a disparity code of "Y" indicating that it does not sort mail pieces 20 for every five-digit area that it services to the same level of refinement. The disparity code Y instructs the address interpretation program that it must continue resolving the destination address image 30' to a level sufficient to identify the five-digit area for which the corresponding mail piece 20 is bound in order to ascertain the required image resolution depth. A secondary depth value 622 associated with the identified five-digit area is then ascertained. The secondary depth value 622 supercedes the default depth value 624 associated with the incoming mail center 200 and indicates the depth at which address interpretation should cease. In the example of FIG. 5C, mail pieces 20 bound for five towns serviced by the Worcester incoming mail center 200 are refined to a lesser degree than those mail pieces 20 bound for all other towns serviced by the Worcester incoming mail center 200. The secondary depth values 622 truncate address interpretation of images 22' to the depth indicated by the depth value 622. Among the advantages provided by such secondary depth values 622 are (i) computer resources are freed up to perform other tasks and (ii) mail pieces 20 will not be rejected on the basis of the inability of automated address interpretation algorithms to resolve address images 22' to depths that are not required. The latter advantage again reduces needless, costly human assistance.

In an alternative version, secondary depth values 622 are used to expand the primary default depth value for an incoming mail center 200. For example, if mail pieces 20 bound for most of the towns serviced by an incoming mail center 200 are sorted to a level of refinement corresponding to a depth value of "3," and only mail pieces 20 bound for a few towns can be sorted to a level of "4," then "3" could be set as the primary (default) depth value 624.

Prioritization and Deferral Aspects

In alternative implementations, the automated interpretation of an address image 22' into an alphanumeric string of resolved address data is deferred. Deferring the resolution of plural images 22' according to specified parameters allows address interpretation of images 22' to be prioritized in accordance with when the resolved information is actually needed as opposed to being resolved on a first-come, first-served basis. Prioritization of image resolution may be made on a number of bases, either alone or in combination. A non-exhaustive list of examples of such bases include (i) class of mail, (ii) whether the mail is stamped or metered, (iii) mode of transportation of a corresponding physical mail piece 20 (e.g., ship, truck or aircraft), (iv) the depth of resolution required and (v) whether the address interpretation operations are carried out all at once or multi-staged. Furthermore, the depth of resolution required could depend on class of mail or any one of the bases of prioritization dependent on another basis or bases of prioritization. Prioritization results in more efficient use of machine and human resources.

As previously discussed, as image data is resolved, the resultant information is stored in a resolved address data block 55 associated with the computer memory record 30' of the unique identification mark 30, for example. Resolution of the second address portion image 26' is deferred in recognition of the fact that the incoming mail center 200 does not require the resolved secondary address data 36 prior to the arrival of the physical mail piece 20 at the incoming mail center 200. Therefore, resolution of secondary address information can be postponed until off-peak times, for example, thereby liberating computer and human resources to process tasks that require processing sooner rather than later. Deferred processing is particularly useful in alleviating process bottlenecks that might otherwise be experienced during peak operating times.

In one implementation, data is stored relating the outgoing mail center 100 to each incoming mail center 200 to which the outgoing mail center 100 transports mail pieces 20. More specifically, at least one predetermined transport time corresponding to each incoming mail center 200 is maintained. Based on this information, a scheduler 180 assigns a deferral time $T_D$ corresponding to a mail piece 20. In one implementation, the deferral time $T_D$ is stored in association with the computer memory record 30' of the unique identification mark 30 corresponding to the physical mail piece 20. For example, in one version, the deferral time $T_D$ is stored as a "tag" associated with the mail piece computer memory folder 60, as shown in FIGS. 5 and 6, for example.

Among the factors that determine the deferral time $T_D$ associated with a particular mail piece 20 are distance to the incoming mail center 200, mode or modes of transportation between the outgoing and incoming mail centers 100 and 200, and class of mail (e.g., first, second, third, priority, express, etc.). Furthermore, the time and date of processing may also be considered. For example, it is not uncommon for an outgoing mail center 100 to have two or more departure times per day for the same incoming mail center 200. Depending on the time of day of each transport vehicle's departure, and the one or more modes of transportation associated with each departure time, the time required to transport a mail piece 20 to the incoming mail center 200 may be different. For instance, a first class mail piece 20 departing on a transport vehicle 158 from the Binghamton hub at 10:00 am may require eight hours to arrive at the Worcester hub. In contrast, a first-class mail piece 20 departing the Binghamton hub at 7:00 pm may require only five hours to arrive at the Worcester hub. The time differential is relatively small when considering transport between two mail centers as closely separated as Binghamton and Worcester. However, one can readily appreciate how this reality of transport can manifest itself over longer distances such as between Binghamton and Los Angeles. Furthermore, even the time deferrals associated with shorter distances between mail centers 100 and 200 are significant.

In one version, in order to account for transport-time variability as a function of departure time, the "check-in time" $T_{CI}$ for a particular mail piece 20 is stored in association with the computer memory record 30' of the unique identification mark 30, for example. An example of such an association is shown in FIG. 3 is which the mail piece data folder 60 corresponding to a physical mail piece 20 is "tagged" with a check-in time $T_{CI}$ of 09:51:38. The check-in time could be, for instance, the time of day that the mail piece 20 is scanned by the OCR 130 at the outgoing mail center 100. In one version, an intra-facility processing time $T_{IFP}$ representing the required processing time at the outgoing mail center 100 is factored in. For instance, if a mail piece 20 normally requires at least 90 minutes to process from the check-in time $T_{CI}$ until loading on a transport vehicle 158, then a mail piece 20 checked in at 9:51:38 am will not be ready for departure at 10:00 am. Accordingly, in keeping with the example above, the next available transport to Worcester is not until 7:00 pm. Therefore, the incoming mail center 200 at Worcester does not need any resolved secondary address data 36 until at least 12:00 am the next morning and a deferral time $T_D$ reflecting the additional allowable time would be assigned accordingly. In one version, a comparitor compares the intra-facility processing time $I_{PT}$ to the time remaining until the next departure for the incoming mail center 200 for which the mail piece 20 is bound. If the intra-facility processing time $I_{PT}$ is greater than the time remaining until the very next departure, the mail piece will be assigned a deferral time $T_D$ corresponding to the departure time of the transport vehicle 158 following the very next departure. In addition to time of day, deferral times $T_D$ may also depend on day-of-week and day-of-year information, for example. An example of the day-of-year effect on transport time was provided in the summary section of this specification. In one version, the check-in time $T_{CI}$ is used later in the processing of the mail piece 20 to determine the transit time as explained further in this description.

In one implementation, the deferral time $T_D$, once determined for a mail piece 20, is associated in memory 120 with the computer memory record 30' of the unique identification mark 30 so that the stored data (e.g., secondary address portion images 26') for plural mail pieces 20 can be prioritized for resolution. For instance, consider a first mail piece 20 checked in at 10:14:23 am and assigned a deferral time $T_D$ of 14.00 hours maximum, and a second mail piece 20 checked in on the same day at 11:33:33 am and assigned a deferral time $T_D$ of 6.00 hours maximum. The resolution of the second address portion image 26' for the second mail piece 20 would be performed prior to the resolution of the second address portion image 26' for the first mail piece 20 because, at 11:33:33 am, the resolved secondary address data 36 for the second mail piece 20 is required before the expiration of 6.00 hours, whereas the resolved secondary address data 36 for the first mail piece 20 is not required for another 12 hours, 40 minutes and 50 seconds. In contrast, in a first-come-first-served system, the resolution of the second address portion image 26' for the first mail piece 20 would be performed prior to the resolution of the second address portion image 26' for the second mail piece 20 simply because the first mail piece 20 was checked in prior to the second mail piece 20.

Referring to FIG. 7, an illustrative scheduler 180 includes a look-up table relating an outgoing mail center 100 to various incoming mail centers 200. In the example of FIG. 7, the outgoing mail center 100 is the hub at Binghamton. The outgoing mail center 100 at Binghamton is related in the table to the incoming mail centers 200 at Worcester, Mass.; Buffalo and Rochester, N.Y. and Austin and Midland, Tex. Furthermore, in this particular example, each deferral time $T_D$ is expressed in terms of a window including a minimum time that must elapse and a maximum time that can elapse before resolved secondary address data 36 is accessible to the incoming mail center 200. For example, consider a mail piece 20 departing the outgoing mail center 100 at Binghamton at 10:10 am and bound for the incoming mail center 200 at Buffalo, N.Y. Referring to the corresponding time window in FIG. 7, the incoming mail center 200 at Buffalo does not need the resolved secondary address data 36 any sooner than 18.25 hours after departure from the outgoing mail center 100 at Binghamton (or whatever point in time is used to trigger the start of the deferral time clock). At the other end of the window, a maximum allowable time of 19.25 hours has been established by which the incoming mail center 200 at Buffalo must have available for its use the resolved secondary address data 36.

In one version, each outgoing mail center 100 is equipped with a scheduler 180 that relates only that outgoing mail center 100 to all of the incoming mail centers 200 to which that outgoing mail center 100 sends mail pieces 20. In another version, an off-site scheduler 180 is communicatively linked to at least two outgoing mail centers 100 for which it assigns deferral times $T_D$ to mail pieces 20. In still another version, the scheduler 180 is included as part of a coding depth file 600.

Figure 8:
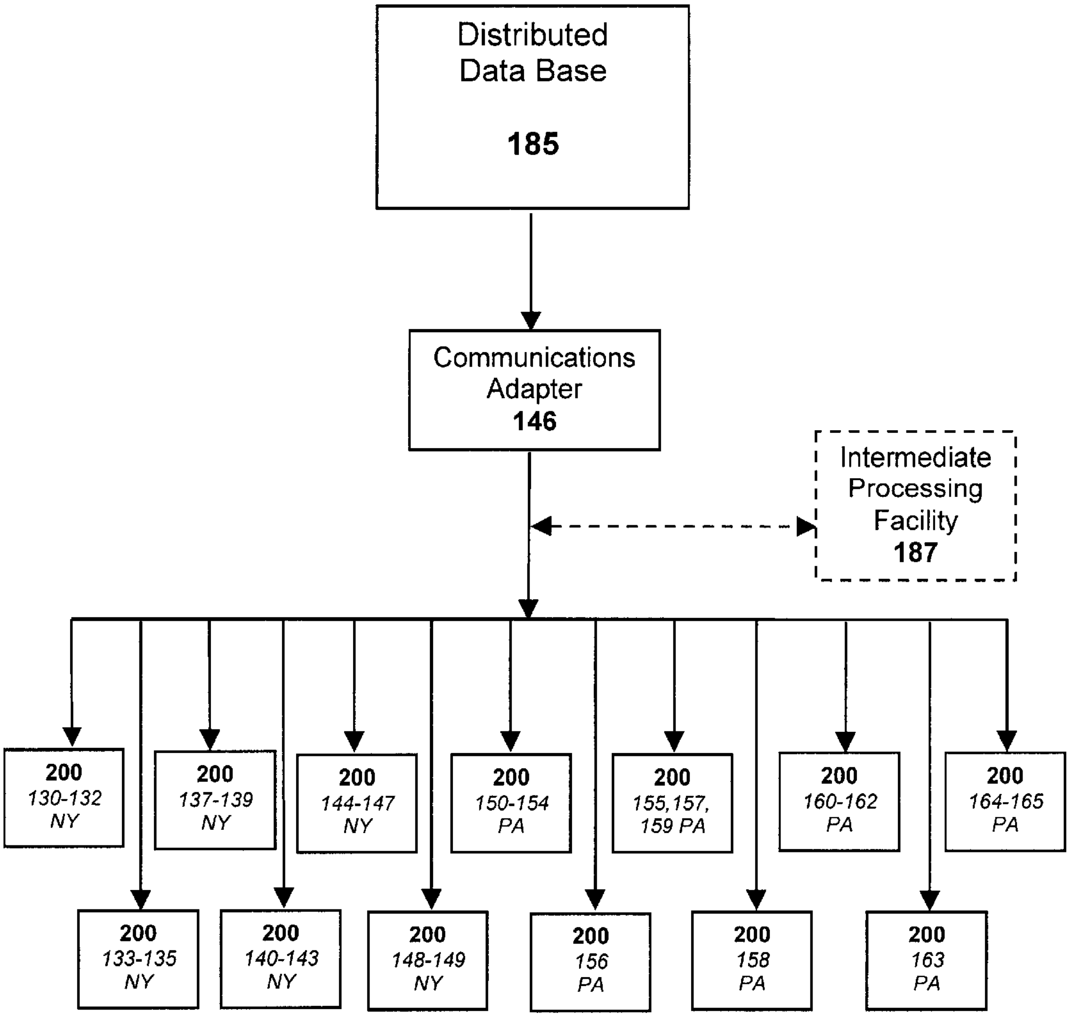
FIG. 8 is of a distributed data base that distributes address information to various incoming mail centers.

Referring to FIGS. 5 and 8, a distributed data base 185 containing stored address information corresponding to each physical mail piece 20 of a plurality of mail pieces 20 distributes the address information via the communications link 148 to various incoming mail centers 200. FIG. 8 represents an illustrative portion of a distributed database 185 and the incoming mail centers 200 communicatively linked to the distributed database 185. The address information is distributed in accordance with the destination of the physical mail pieces 20 to which the stored address information corresponds and in accordance with the deferral times $T_D$ associated with the stored address data pertaining to the physical mail pieces 20. The address information that is communicated to an incoming mail center 200 for any single mail piece 20 can be in alternative forms. For example, the second address portion image 26' for a mail piece 20 may be resolved at the outgoing mail center 100 while the mail piece 20 to which it corresponds is in transit to the incoming mail center 200. In this case, the resolved secondary address data 36 is communicated in association with the computer memory record 30' of the unique identification mark 30 to the incoming mail center 200. In another version, the unresolved second address portion image 26' data is communicated from the outgoing mail center 100 to the incoming mail center 200, or to some third, intermediate processing facility 187, for resolution to be resolved to secondary address data 36. The principal concern is that, by the time the incoming mail center 200 requires it, the resolved secondary address data 36 is available for further sorting and routing of each mail piece 20, regardless of where the address data is resolved. Address information can be communicated between outgoing and incoming mail centers 100 and 200 by alternative media including, for example, hardwire electrical signal conduits, optical fiber cables and/or electromagnetic waves received and transmitted by satellites or other signal relaying apparatus.

In one version, a distributed database 185 is located at each outgoing mail center 100. In another version, each of at least two outgoing mail centers 100 transmits address information to an off-site distributed database 185 that serves two or more outgoing mail centers 100 where it is then processed and distributed to the various incoming mail centers 200.

In alternative implementations, the address information that is transmitted to an incoming mail center 200 includes, for example, the image data block 50 with the first and second address portion images 24' and 26'; the second address image portion 26' without the first address image portion 24'; the resolved primary address data 34; the resolved secondary address data 36; and the computer memory record 30' of unique identification mark 30. Transmission of the computer memory record 30' of the unique identification mark 30 with the associated address data facilitates the association of the address data with the corresponding physical mail piece 20 at the incoming mail center 200. Regardless of the type of information that is transmitted, in one version, the information corresponding to a single physical mail piece 20 is assembled in a mail piece computer memory folder 60 and the entire computer memory folder 60 is transmitted to the incoming mail center 200. In another version, only those portions of the computer memory folder 60 required to generate the sortation signals needed by the sorting machinery 500 at the incoming mail center 200 are transmitted. In still another version, a second set of sortation signals associated with a computer memory record 30' of the unique identification mark 30 corresponding to a physical mail piece 20 is transmitted to the incoming mail center 200.

Referring again to FIG. 6, a physical mail piece 20 arrives at an incoming mail center 200 and an identification reader 230 scans the unique identification mark 30 appearing on the mail piece 20. By this time, the resolved secondary address data 36 for the mail piece 20 is accessible to the incoming mail center 200. The CPU 212 at the incoming mail center 200 associates the identification mark 30 as read from the physical mail piece 20 with the corresponding resolved secondary address data 36 that is stored in memory 220 and applies this information to send instructions to the sorting machinery 500. The sorting machinery 500 further sorts the mail piece 20 to one or more levels of sortation refinement, as previously discussed, and they are loaded onto an appropriate transport vehicle 258 for further delivery.

In one version, a time tracker 280 logs the arrival time $T_A$ of a mail piece 20 at the incoming mail center 200. The arrival time $T_A$ can correspond, for example, to a second predetermined point in the handling process at the incoming mail center 200. For instance, the assigned arrival time $T_A$ may be the time at which the identification reader 230 reads the unique identification mark 30. The arrival time $T_A$ for each mail piece 20 is associated with the computer memory record 30' of the unique identification mark 30 corresponding to each mail piece 20 for which transit time $T_T$ is to be tracked. A transit time calculator 282, once provided with the departure time or check-in time $T_{CI}$, for example, and the arrival time $T_A$ of a particular mail piece 20, calculates the transit time $T_T$ for the mail piece 20. The transit time data is stored in a transit-statistics data base 285. In the example of FIG. 6, the mail piece 20 checked in at $T_{CI}$=09:51:38 the previous day at the outgoing mail center 100 in FIG. 5 arrives at the incoming mail center 200 at 02:06:48 as shown in association with the mail piece computer memory folder 60 corresponding to the mail piece 20 in FIG. 6. In the example of FIG. 6, the transit time calculator 282 calculates the transit time as $T_T$=16 hours 15 min. and 10 sec. (i.e., 16:15:10). This information is then communicated to the transit-statistics data base 285 from which it can be retrieved and compiled with data relative to other mail pieces 20 for the purposes of calculating average transit times $T_T$, for example.

In alternative versions, any or all of the time tracker 280, transit time calculator 282 and the transit-statistics data base 285 may be located at the incoming mail center 200 or at an off-site facility. When any or all of the time tracker 280, transit time calculator 282 and the transit-statistics data base 285 are located off-site, the relevant data is communicated through the communications adaptor 246 to the proper location for processing and/or storage, for example.

A transit-statistics database 285 is part of the architecture of the incoming mail center 200 shown in FIG. 6. In another version, an off-site transit-statistics database 285 is communicatively linked to, and receives transit data from, several incoming mail centers 200. In another version, a time calculator 282 and transit-statistics database 285 are maintained at each outgoing mail center 100. In this version, arrival time $T_A$ information is distributed back to the various outgoing mail centers 100 from which respective mail pieces 20 originated so that the transit time calculators 282 at the outgoing mail centers 100 of origin can compute the elapsed transit times $T_T$ for mail pieces 20 handled by them.

Regardless of where transit time data is computed and stored, the transit time data is useful in computing appropriate deferral times $T_D$ for use in a scheduler 180, for example. In one version, deferral times $T_D$ used in schedulers 180 are updated periodically based on transit-time data maintained over a predetermined period of time. In another version, deferral times $T_D$ are constantly updated on the basis of real-time statistical data. For instance, a deferral time $T_D$ are constantly updated on the particular departure time from a particular outgoing mail center 100 and incoming mail center 200 may be constantly updated on the basis of a moving average transit time over a fixed duration. By way of illustration, a deferral time $T_D$ may be calculated on the basis of the average transit time $T_T$ between a particular outgoing mail center 100 and a particular incoming mail center 200, for a particular scheduled departure time, over the immediately previous 120 hours (i.e., 5 days).

Illustrative Multi-staged Image Processing Aspect

In alternative versions, as previously discussed, resolution of destination address filed images 22' down to the depth dictated by a coding depth file may be performed in two or more temporally separated stages. For example, in one version, the destination address field image 22' is resolved fully to the second depth indicated by a primary depth value, for example, in stages separated temporally by interim deferral times. To illustrate how this can be used to optimize resource utilization, reference is made to the mail piece 20*x* previously discussed in connection with FIGS. 5, 6–6C, and in connection with 9.

Consider the mail piece 20*x* that is bound for 2 First Street Littleton, Mass. As shown in FIGS. 6A through 6C, the mail piece 20*x* undergoes three temporarily separated sort "passes" at the incoming mail center 200. In this illustrative example, full-refinement sortation capability was attributed to the incoming mail center 200 at Worcester for mail pieces 20 bound for Littleton, Mass. Accordingly, full address resolution to the second depth results in sortation signals that allow mail piece 20*x* to be sorted down to delivery sequence by the automated sorting machinery 500 at the incoming mail center 200. However, as discussed previously, each subsequent sort pass requires a sortation signal resulting from deeper resolution of the address field image 22' corresponding to the mail piece 20*x*. Therefore, at the first sort pass illustrated in FIG. 6A, there is no need for the address field image 22' to have been resolved to a level required to generate a sortation signal needed for automated delivery sequence sorting as in FIG. 6C. The sortation signal required for delivery sequence sortation is not required until a subsequent point in time. Accordingly, resolution of the address field image 22' to the second depth can occur in temporarily separated stages as long as at each subsequent sort pass the portion of the second set of signals necessary to automatically execute the sortation corresponding to that sort pass is accessible to the applicable part of the second set of automated sorting machinery 500.

Figure 9:
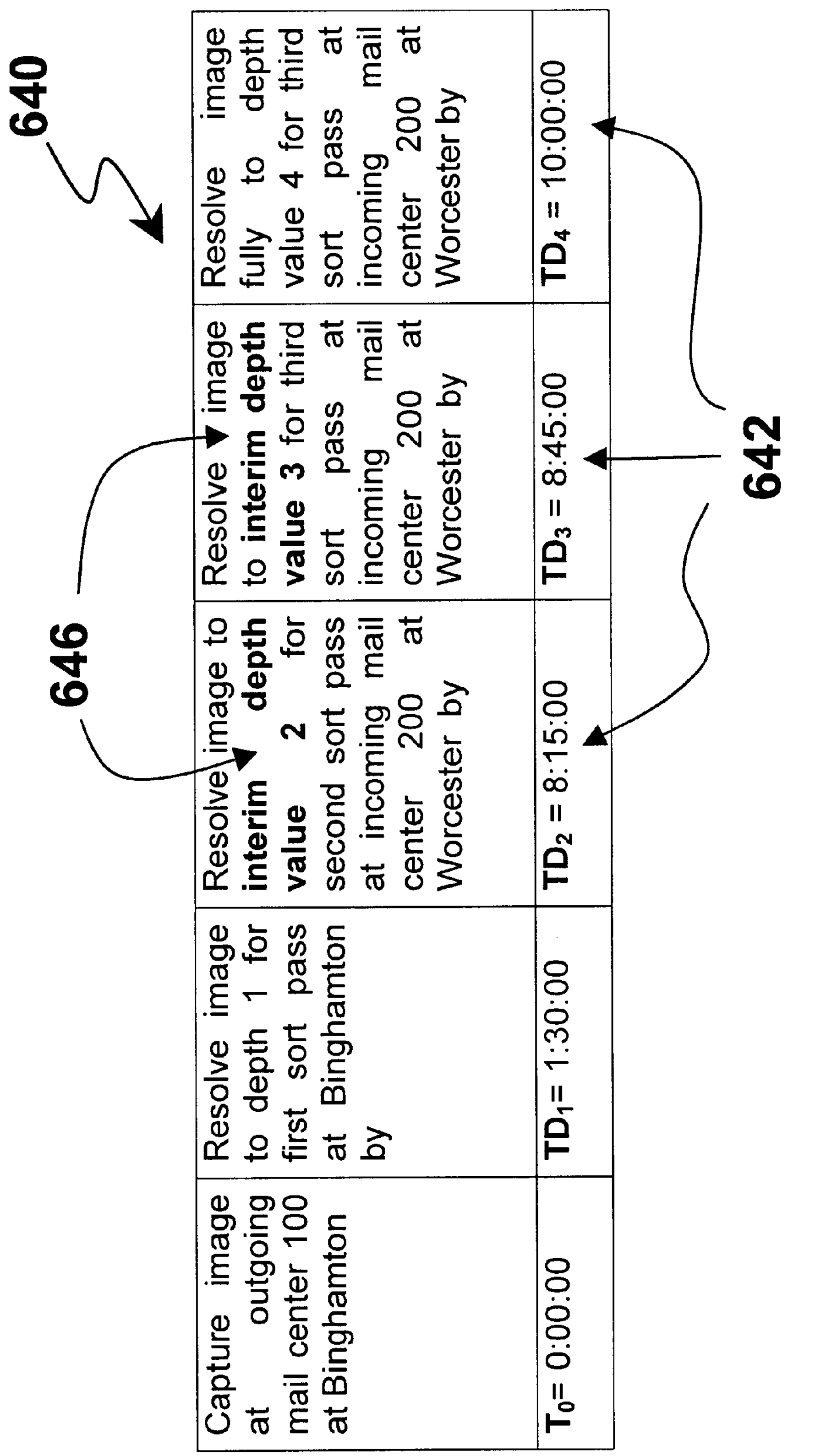
FIG. 9 depicts a portion of a coding depth file reflecting deferral times for each stage in a multistage destination address image-processing scheme.

Referring to FIG. 9, a portion of a coding depth file 640 includes plural interim deferral times 642 to be a associated with a destination address field image 22' captured at $T_0$=0:00:00 at the outgoing mail center 100 in Binghamton. In this example, the coding depth file 640 associates with the destination address field image 22' a first interim deferral time $TD_1$ of 1.5 hours for address interpretation of the destination address field image 22' to the first depth to occur at the outgoing mail center 100. Once resolution to this first depth is completed, the incoming mail center 200 for which the mail piece 20*x* is bound can be ascertained as discussed, for example, in connection with FIG. 5A. The primary (or default) depth value corresponding to the identified incoming mail center 200 can then be ascertained as explained, for example, in connection with FIG. 5C. Alternatively, as shown in FIG. 9, the coding depth file 640 can define the maximum applicable depth value by associating interim depth values 646, for instance, with the destination address field image 22'. The maximum applicable depth value is, for instance, the primary depth value associated with an incoming mail center 200 or, alternatively, an overriding secondary depth value like the depth values 622 discussed in connection with FIG. 5C. As shown in the example of FIG. 9, interim depth values 646 correspond to the sort passes illustrated in, and discussed in connection with, FIGS. 5, 6A and 6B. The final interim depth value in this example is depth 4 and corresponds to the final, delivery sequence sort pass illustrated in FIG. 6C. Associated with the levels of address interpretation represented by interim depth values 646 are interim deferral times $TD_2$ and $TD_3$, respectively. Deferral time $TD_4$ is associated with the level of address interpretation represented by depth value 4.

As each stage of image resolution is achieved, a sorting signal is generated for the next subsequent stage in the automated sortation of the corresponding physical mail piece 20. Furthermore, following resolution to each interim depth, the corresponding destination address field image 22' can be "taken off line" until it is subsequently re-queued for the next subsequent depth of resolution, and so on until the maximum applicable depth of resolution has been achieved.

The multi-stage aspects discussed above illustrative a somewhat fixed application of interim deferral times 642 corresponding to interim resolution depths. In an alternative version, the deferral time 642 between a "current" stage of resolution and a subsequent stage of resolution is associated with the destination address field image 22' upon completion of the "current" stage of resolution. For this purpose, multiple look-up tables, for example, may be included in a coding depth file otherwise be accessible to the data processing system.

The foregoing is considered to be illustrative of the principles of the invention. Furthermore, since modifications and changes will occur to those skilled in the art without departing from the scope and spirit of the invention, it is to be understood that the foregoing does not limit the invention as expressed in the appended claims to the exact construction, implementations and versions shown and described.

What is claimed is:

1. A method of processing a mail piece through an outgoing mail center and an incoming mail center for delivery to an addressee, the mail piece having a destination address field including sufficient information to deliver the mail piece to an addressee from the incoming mail center, the method comprising the steps of:

receiving the mail piece at the outgoing mail center;

capturing an image of the destination address field at the outgoing mail center and storing the image in computer memory, the captured image being resolvable to at least two depths of resolution in which a greater resolution depth more closely represents the final intended delivery point of the associated physical mail piece than do lesser resolution depths;

marking the mail piece with a unique identification mark representing its identity and storing a computer memory record of the identification mark in association with the stored destination address field image;

resolving the captured destination address field image to a first depth sufficient to generate a first set of sortation signals representative of the incoming mail center;

sorting the mail piece at the outgoing mail center in response to the first set of sortation signals for transport to the incoming mail center;

associating a resolution depth value with the stored address field image, the resolution depth value correlating to the maximum depth to which captured destination address field images corresponding to physical mail pieces destined for the incoming mail center are to be resolved before cessation of resolution, the associated resolution depth value corresponding to a level of refinement to which the incoming mail center sorts mail pieces;

resolving the captured destination address field image to a second depth not exceeding the depth indicated by the resolution depth value to generate a second set of sortation signals;

associating the second set of sortation signals with the computer memory record of the identification mark corresponding to the physical mail piece;

transporting the mail piece from the outgoing mail center to the incoming mail center;

rendering the second set of sortation signals accessible to the incoming mail center;

receiving the mail piece at the incoming mail center;

identifying the mail piece at the incoming mail center by reading the unique identification mark thereon and associating the mail piece with the second set of sortation signals; and sorting the mail piece in response to the second set of sortation signals.

2. The method of claim 1 further including the step of deferring resolution of the destination address field image to the second depth in accordance with a set of predetermined parameters.

3. The method of claim 2 wherein the step of deferring resolution of the destination address field image to the second depth comprises:

maintaining data relating the outgoing mail center and the incoming mail center, the data including at least a predetermined transit time indicative of the time required for the mail piece to be transported from the outgoing mail center to the incoming mail center; and consulting the maintained data and establishing a predetermined deferral time based on the transport time data, the deferral time representing at least an acceptable maximum length of time that can elapse from an established point in time in the processing of the mail piece before the destination address image is resolved to the second depth and the second set of sortation signals is made accessible to the incoming mail center.

4. The method according to claim 3 wherein the deferral time comprises a time window including, in addition to a maximum length of time that can elapse from a first established point in the processing of the mail piece before the destination address field image is resolved to the second depth and the second set of sortation signals is made accessible to the incoming mail center, a minimum length of time that must elapse from the first established point in the processing of the mail piece before the resolution of the destination address field image to the second depth commences and wherein the step of resolving to the second depth does not commence prior to the expiration of the minimum length of time.

5. The method according to claim 1 wherein the second set of sortation signals is received by the incoming mail center via a communications link from a distributed data base that stores and distributes to diverse incoming mail centers second sets of signals in association with computer memory records of identification marks corresponding to plural mail pieces.

6. The method according to claim 1 wherein the incoming mail center receives the destination address field image associated with the computer memory record of the unique identification mark corresponding to the physical mail piece and wherein resolution of the destination address field image to the second depth in order to generate the second signal occurs at the incoming mail center.

7. The method according to claim 2 wherein the destination address field image is resolved to the second depth in at least two temporally separated, interim stages.

8. The method according to claim 7 wherein resolving the destination address field image to the second depth in at least two temporally separated, interim stages comprises the steps of:

(i) associating with the stored destination address field image interim depth values defining depths of resolution short of full resolution to the second depth; and (ii) associating a deferral time with each interim stage of resolution, each deferral time representing at least an acceptable maximum length of time that can elapse from an established point in time in the processing of the mail piece before the destination address field image is resolved to the depth corresponding to the associated interim stage and the resultant, interim sortation signals are rendered accessible to the incoming mail center.

9. A method of processing mail pieces through an outgoing mail center and plural incoming mail centers, each mail piece having a destination address field including sufficient information to deliver the mail piece to an addressee from an incoming mail center, the method comprising the steps of:

providing a data processing system including a central processor, at least one memory device connected to the processor, image-capturing apparatus adapted for capturing and storing an image of an address field appearing on a mail piece in the computer memory, and an address interpretation program for resolving stored destination address field images and producing and outputting sortation signals based on such image resolution;

providing, at the outgoing mail center, image-capturing apparatus and a first set of automated mail-sorting machinery that sorts mail pieces in response to computer-generated sortation signals, the first set of automated mail-sorting machinery being communicatively linked to the data processing system and being adapted to sort each mail piece to a first level of refinement based on a first set of sortation signals resulting from automated address interpretation of a corresponding stored destination address field image to a first depth of resolution, the first depth of resolution being at least sufficiently deep to identify a single incoming mail center for which the corresponding mail piece is bound;

providing, at each incoming mail center, a second set of automated mail-sorting machinery, the second set of automated mail-sorting machinery being communicatively linked to the data processing system and being adapted to sort a mail piece to a second level of refinement greater than the first level of refinement based on a second set of sortation signals resulting from automated address interpretation of the corresponding stored destination address field image to a second depth of resolution that is deeper than the first depth of resolution, the maximum levels of sortation refinement at the plural incoming mail centers being one of (i) uniform and (ii) disparate; and providing a first set of data accessible to the data processing system, the first set of data associating a primary resolution depth value with each incoming mail center, the resolution depth value correlating to the maximum depth to which a captured destination address field image corresponding to a physical mail piece destined for the incoming mail center for which the mail piece is bound are to be resolved before cessation of resolution, the associated resolution depth value corresponding to a level of refinement to which the second set of sorting machinery at the incoming mail center sorts mail pieces.

10. The method of claim 9 further comprising:

receiving a mail piece at the outgoing mail center;

capturing an image of the destination address field at the outgoing mail center and storing the destination address field image in the computer memory, the captured image being resolvable to various depths of resolution in which a greater resolution depth more closely represents the final intended delivery point of the associated physical mail piece than does a lesser resolution depth;

marking the mail piece with a unique identification mark representing the identity of the mail piece and storing a computer memory record of the identification mark in association with the stored destination address field image;

resolving the captured destination address field image to a first depth sufficient to generate a first set of sortation signals representative of the incoming mail center for which the mail piece is bound;

sorting the mail piece, using the first set of automated mail-sorting machinery at the outgoing mail center, in response to the first set of sortation signals for transport to the incoming mail center;

consulting the first set of data to ascertain the primary resolution depth value associated with the incoming mail center for which the mail piece is bound;

resolving the destination address field image to a second depth not exceeding the depth indicated by the primary resolution depth value to generate a second set of sortation signals;

associating the second set of sortation signals with the computer memory record of the identification mark corresponding to the physical mail piece;

transporting the mail piece from the outgoing mail center to the incoming mail center;

rendering the second set of signals accessible to the second set of automated sorting machinery at the incoming mail center;

receiving the mail piece at the incoming mail center;

identifying the mail piece at the incoming mail center by reading the unique identification mark thereon and associating the mail piece with the second set of sortation signals; and sorting the mail piece, using the second set of automated mail-sorting machinery at the incoming mail center, in response to the second set of sortation signals.

11. The method of claim 10 further comprising:

providing a second set of data accessible to the data processing system, the second set of data associating a deferral time with the stored destination address field image corresponding to each mail piece of a selected plurality of mail pieces processed by the first set of sorting machinery, the deferral time representing at least an acceptable maximum length of time that can elapse from a first established point in time in the processing of the mail piece before the stored destination address field image corresponding to the mail piece is resolved to the second depth and the resulting second set of sortation signals is rendered accessible to the second set of mail-sorting machinery.

12. The method of claim 11 further comprising:

consulting the second set of data to ascertain the deferral time associated with a destination address field image; and rendering the second set of sortation signals accessible to the incoming mail center prior to the expiration of the maximum length of time represented by the deferral time.

13. A method of processing mail pieces through an outgoing mail center and plural incoming mail centers, each mail piece having a destination address field including sufficient information to deliver the mail piece to an addressee from an incoming mail center, the method comprising the steps of:

providing a data processing system including a central processor, at least one memory device connected to the processor, image-capturing apparatus adapted for capturing and storing an image of an address field appearing on a mail piece in the computer memory, and an address interpretation program for resolving stored destination address field images and producing and outputting sortation signals based on such image resolution;

providing, at the outgoing mail center, image-capturing apparatus and a first set of automated mail-sorting machinery that sorts mail pieces in response to computer-generated sortation signals, the first set of automated mail-sorting machinery being communicatively linked to the data processing system and being adapted to sort each mail piece to a first level of refinement based on a first set of sortation signals resulting from automated address interpretation of a corresponding stored destination address field image to a first depth of resolution, the first depth of resolution being at least sufficiently deep to identify a single incoming mail center for which the corresponding mail piece is bound;

providing, at each incoming mail center, a second set of automated mail-sorting machinery, the second set of automated mail-sorting machinery being communicatively linked to the data processing system and being adapted to sort a mail piece to a second level of refinement greater than the first level of refinement based on a second set of sortation signals resulting from automated address interpretation of the corresponding stored destination address field image to a second depth of resolution that is deeper than the first depth of resolution, the maximum levels of sortation refinement at the plural incoming mail centers being one of (i) uniform and (ii) disparate;

providing a first set of data accessible to the data processing system, the first set of data associating a primary resolution depth value with each incoming mail center, the resolution depth value correlating to the maximum depth to which a captured destination address field image corresponding to a physical mail piece destined for the incoming mail center for which the mail piece is bound are to be resolved before cessation of resolution, the associated resolution depth value corresponding to a level of refinement to which the second set of sorting machinery at the incoming mail center sorts mail pieces;

receiving a mail piece at the outgoing mail center;

capturing an image of the destination address field at the outgoing mail center and storing the image in the computer memory, the captured image being resolvable to various depths of resolution in which a greater resolution depth more closely represents the final intended delivery point of the associated physical mail piece than does a lesser resolution depth;

marking the mail piece with a unique identification mark representing the identity of the mail piece and storing a computer memory record of the identification mark in association with the stored destination address field image;

resolving the captured destination address field image to a first depth sufficient to generate a first set of sortation signals representative of the incoming mail center for which the mail piece is bound;

sorting the mail piece, using the first set of automated mail-sorting machinery at the outgoing mail center, in response to the first set of sortation signals for transport to the incoming mail center;

consulting the first set of data to ascertain the primary resolution depth value associated with the incoming mail center for which the mail piece is bound;

transporting the mail piece from the outgoing mail center to the incoming mail center;

receiving the mail piece at the incoming mail center;

identifying the mail piece at the incoming mail center by reading the unique identification mark thereon and associating the mail piece with the second set of sortation signals;

providing a second set of data accessible to the data processing system, the second set of data associating a deferral time with the stored destination address field image corresponding to each mail piece of a selected plurality of mail pieces processed by the first set of sorting machinery, the deferral time representing at least an acceptable maximum length of time that can elapse from a first established point in time in the processing of the mail piece before the stored destination address field image corresponding to the mail piece is resolved to the second depth and the second set of sortation signals is rendered accessible to the second set of mail-sorting machinery;

consulting the second set of data to ascertain the deferral time associated with the destination address field image;

resolving the captured destination address field image to a second depth not exceeding the depth indicated by the primary resolution depth value to generate a second set of sortation signals;

associating the second set of sortation signals with the computer memory record of the identification mark corresponding to the physical mail piece;

rendering the second set of sortation signals accessible to the second set of automated mail-sorting machinery at the incoming mail center prior to the expiration of the maximum length of time represented by the deferral time; and sorting the mail piece, using the second set of automated mail-sorting machinery at the incoming mail center, in response to the second set of sortation signals.

14. A system for processing mail pieces through first and second sets of automated mail-sorting machinery, the system comprising:

a data processing system including a central processor, at least one memory device connected to the processor, image-capturing apparatus adapted for capturing and storing an image of an address field appearing on a mail piece in the computer memory, and an address interpretation program for resolving stored destination address field images and producing and outputting sortation signals based on such image resolution;

a first set of automated mail-sorting machinery including at least one automated sorting machine that sorts mail pieces in response to computer-generated sorting signals, the first set of automated mail-sorting machinery being communicatively linked to the data processing system and being adapted to sort a mail piece to a first level of refinement based on a first set of sortation signals resulting from automated address interpretation of a corresponding stored destination address field image to a first depth of resolution;

a second set of automated mail-sorting machinery including at least one automated sorting machine that sorts mail pieces in response to computer-generated sorting signals, the second set of automated mail-sorting machinery being communicatively linked to the data processing system and being adapted to sort a mail piece to a second level of refinement greater than the first level of refinement based on a second set of sortation signals resulting from automated address interpretation of the corresponding stored destination address image to a second depth of resolution that is deeper than the first depth of resolution; and a first set of data accessible to the data processing system, the first set of data associating a resolution depth value with the second set of sorting machinery, the resolution depth value correlating to the maximum depth to which captured destination address field images corresponding to physical mail pieces destined for the second set of sorting machinery are to be resolved before cessation of resolution, the associated resolution depth value corresponding to a level of refinement to which the second set of sorting machinery sorts mail pieces.

15. The system of claim 14 further comprising a second set of data associating a deferral time with the stored destination address field image corresponding to a mail piece processed by the first set of sorting machinery, the deferral time representing at least an acceptable maximum length of time that can elapse from a first established point in time in the processing of the mail piece before the stored destination address field image corresponding to the mail piece is resolved to the second depth and the second set of sortation signals is rendered accessible to the second set of mail-sorting machinery.

16. The system according to claim 15 wherein the deferral time comprises a time window including, in addition to a maximum length of time that can elapse from a first established point in the processing of the mail piece before the destination address field image is resolved to the second depth and made accessible to the incoming mail center, a minimum length of time that must elapse from the first established point in the processing of the mail piece before the resolution of the destination address field image to the second depth commences and wherein the step of resolving to the second depth does not commence prior to the expiration of the minimum length of time.

17. A system for processing mail pieces through an outgoing mail center and plural incoming mail centers, the system comprising:

a data processing system including a central processor, at least one memory device connected to the processor, image-capturing apparatus adapted for capturing and storing in the computer memory an image of an address field appearing on a mail piece, and an address interpretation program for resolving stored images of destination address fields and producing and outputting sortation signals based on such image resolution;

an outgoing mail center including the image capturing apparatus and having a first set of automated mail-sorting machinery that sorts mail pieces in response to computer-generated sortation signals, the first set of automated mail-sorting machinery being communicatively linked to the data processing system and being adapted to sort each mail piece to a first level of refinement based on a first set of sortation signals resulting from automated address interpretation of a corresponding stored destination address field image to a first depth of resolution, the first depth of resolution being at least sufficiently deep to identify a single incoming mail center for which the corresponding mail piece is bound;

at least two incoming mail centers to which the outgoing mail center sends physical mail pieces, each incoming mail center having a second set of automated mail-sorting machinery that sorts mail pieces in response to computer-generated sorting signals, the second set of automated mail-sorting machinery being communicatively linked to the data processing system and being adapted to sort a mail piece to a second level of refinement greater than the first level of refinement based on a second set of sortation signals resulting from automated address interpretation of the corresponding stored destination address image to a second depth of resolution that is deeper than the first depth of resolution; and a first set of data accessible to the data processing system, the first set of data associating a primary resolution depth value with each incoming mail center, the resolution depth value correlating to the maximum depth to which captured destination address field images corresponding to physical mail pieces destined for the incoming mail center are to be resolved before cessation of resolution, the associated resolution depth value corresponding to a level of refinement to which the second set of sorting machinery at the incoming mail center sorts mail pieces.

18. The system of claim 17 further comprising a second set of data associating a deferral time with the stored destination address field image corresponding to each mail piece of a selected plurality of mail pieces processed by the first set of automated mail-sorting machinery at the outgoing mail center, the deferral time representing at least an acceptable maximum length of time that can elapse from a first established point in time in the processing of the mail piece before the stored destination address field image corresponding to the mail piece is resolved to the second depth and the resulting second set of sortation signals is rendered accessible to the second set of mail-sorting machinery at the incoming mail center for which the mail piece is bound.

19. The system of claim 18 wherein each incoming mail center services a service area comprised of at least two regions, each region is divided into sectors and mail is delivered according to delivery sequence within each sector, and wherein at least one incoming mail center sorts mail to disparate levels of refinement for at least two regions within the service area of that incoming mail center based on at least one of (i) the region and (ii) the sector for which a mail piece is destined and (iii) the delivery sequence of the mail piece, the system further comprising a set of depth value data relating a secondary depth value to each region for which mail is sorted to a sortation refinement level different from the sortation refinement level corresponding to the primary depth value associated with the incoming mail center by which that region is serviced, the secondary depth value superceding the primary depth value.

20. The system of claim 19 further comprising a second set of data associating a deferral time with the stored destination address field image corresponding to each mail piece of a selected plurality of mail pieces processed by the first set of sorting machinery at the outgoing mail center, the deferral time representing at least an acceptable maximum length of time that can elapse from a first established point in time in the processing of the mail piece before the stored destination address field image corresponding to the mail piece is resolved to the second depth and the resulting second set of sortation signals is rendered accessible to the second set of mail-sorting machinery at the incoming mail center for which the mail piece is bound.

* * * * *